(12) United States Patent
Fujisawa

(10) Patent No.: US 7,782,719 B2
(45) Date of Patent: Aug. 24, 2010

(54) EDITING APPARATUS FOR OPTICAL DISC REPRODUCING DEVICE

(75) Inventor: Hiroshi Fujisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/471,856

(22) Filed: Jun. 21, 2006

(65) Prior Publication Data

US 2007/0070826 A1 Mar. 29, 2007

Related U.S. Application Data

(63) Continuation of application No. 11/147,884, filed on Jun. 8, 2005, which is a continuation of application No. 10/380,018, filed as application No. PCT/JP02/06406 on Jun. 26, 2002, now Pat. No. 7,149,156.

(30) Foreign Application Priority Data

Jul. 11, 2001 (JP) .............................. 2001-211193

(51) Int. Cl.
G11B 21/08 (2006.01)

(52) U.S. Cl. ..................... 369/30.05; 707/104.1; 707/1; 707/3

(58) Field of Classification Search ... 369/30.05–30.08, 369/83; 707/1, 3, 104.1, 999.107, 999.001, 707/999.03

See application file for complete search history.

(56) References Cited

U.S. PATENT DOCUMENTS

| 5,216,644 A | 6/1993 | Shiba et al. |
|---|---|---|
| 5,737,287 A | 4/1998 | Lee |
| 5,822,284 A | 10/1998 | Nishizawa |
| 5,917,488 A * | 6/1999 | Anderson et al. ........... 715/838 |
| 5,920,535 A | 7/1999 | Hisamatsu et al. |
| 6,034,925 A * | 3/2000 | Wehmeyer ................ 369/30.28 |
| 6,088,304 A | 7/2000 | Aramaki et al. |
| 6,157,597 A * | 12/2000 | Fleming, III ................ 369/30.3 |
| 6,172,948 B1 * | 1/2001 | Keller et al. ................... 369/83 |
| 6,288,991 B1 * | 9/2001 | Kajiyama et al. ......... 369/47.23 |
| 6,298,022 B1 | 10/2001 | Aramaki et al. |
| 6,356,971 B1 * | 3/2002 | Katz et al. ................... 710/301 |
| 6,434,103 B1 | 8/2002 | Shitara et al. |
| 6,449,226 B1 * | 9/2002 | Kumagai .................... 369/47.1 |
| 6,512,722 B2 | 1/2003 | Kumagai |
| 6,542,445 B2 | 4/2003 | Ijichi et al. |
| 6,560,403 B1 * | 5/2003 | Tanaka et al. .................. 386/95 |
| 6,567,349 B2 | 5/2003 | Nagata et al. |

(Continued)

FOREIGN PATENT DOCUMENTS

JP 04-265592 9/1992

(Continued)

*Primary Examiner*—Tan X Dinh
(74) *Attorney, Agent, or Firm*—Wolf, Greenfield & Sacks, P.C.

(57) ABSTRACT

A reproducing apparatus comprises storage to store a plurality of programs being managed as a group, and management information including group information of programs, an input unit, a reproduction unit, and a controller to control the reproduction unit to reproduce a highlight of a program in a group from a plurality of groups. The highlight of the program may be representative of an album. Thus, when the highlight of the program is reproduced, a user can easily search for a desired album.

23 Claims, 31 Drawing Sheets

U.S. PATENT DOCUMENTS

| | | |
|---|---|---|
| 6,594,740 B1 | 7/2003 | Fukuda |
| 6,614,732 B2 | 9/2003 | Nonaka et al. |
| 6,674,692 B1 * | 1/2004 | Holland .................. 369/7 |
| 6,771,569 B2 | 8/2004 | Nagata et al. |
| 6,836,385 B2 * | 12/2004 | Naohara et al. ............... 360/15 |
| 6,882,598 B2 | 4/2005 | Yoshida |
| 6,898,159 B2 | 5/2005 | Kudo |
| 7,046,588 B2 * | 5/2006 | Heo .................. 369/32.01 |
| 7,130,616 B2 * | 10/2006 | Janik .................. 455/412.1 |
| 7,149,156 B2 * | 12/2006 | Fujisawa ............... 369/30.05 |
| 2002/0013852 A1 * | 1/2002 | Janik .................. 709/231 |
| 2002/0021629 A1 | 2/2002 | Hitotsui |
| 2002/0041540 A1 | 4/2002 | Nagata et al. |
| 2002/0057297 A1 * | 5/2002 | Grimes et al. ............... 345/810 |
| 2002/0059200 A1 * | 5/2002 | Aida et al. .................. 707/3 |
| 2004/0223245 A1 | 11/2004 | Morohashi |
| 2004/0255340 A1 * | 12/2004 | Logan .................. 725/145 |
| 2005/0076008 A1 * | 4/2005 | Kudou .................. 707/3 |

FOREIGN PATENT DOCUMENTS

| | | |
|---|---|---|
| JP | 5-233699 A | 9/1993 |
| JP | 05-233699 A | 9/1993 |
| JP | 6-253255 A | 9/1994 |
| JP | 06-253255 A | 9/1994 |
| JP | 08-180657 A | 7/1996 |
| JP | 8-180657 A | 7/1996 |
| JP | 08-329662 | 12/1996 |
| JP | 09-073461 A | 3/1997 |
| JP | 9-073461 A | 3/1997 |
| JP | 10-051733 A | 2/1998 |
| JP | 10-208445 | 8/1998 |
| JP | 11-146333 | 5/1999 |
| JP | 11-146333 A | 5/1999 |
| JP | 11-308567 | 11/1999 |
| JP | 2000-253351 A | 9/2000 |
| JP | 2000-253351 A | 9/2000 |
| JP | 2000-353375 A | 12/2000 |
| JP | 2000-354228 A | 12/2000 |
| JP | 2001-050211 A | 2/2001 |
| JP | 2001-142495 | 5/2001 |
| JP | 2001-142495 A | 5/2001 |
| JP | 2002-074911 | 3/2002 |

* cited by examiner

| FRAME | P | Q | R | S | T | U | V | W |
|---|---|---|---|---|---|---|---|---|
| F1 | S0 | | | | | | | |
| F2 | S1 | | | | | | | |
| F3 | P1 | Q1 | R1 | S1 | T1 | U1 | V1 | W1 |
| F4 | P2 | Q2 | R2 | S2 | T2 | U2 | V2 | W2 |
| ⋮ | ⋮ | ⋮ | ⋮ | ⋮ | ⋮ | ⋮ | ⋮ | ⋮ |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

| |
|---|
| TOTAL CAPACITY |
| NUMBER OF FOLDERS |
| PLAY LIST START NUMBER |
| ALL FOLDER TOTAL USE TIME |
| TOTAL RECORDABLE TIME |
| ALL FOLDER BLANK INFORMATION |
| ALBUM 1 POINTER |
| ALBUM 2 POINTER |
| ALBUM 3 POINTER |
| ALBUM 4 POINTER |
| ALBUM 5 POINTER |
| |
| |
| |
| |
| |
| ALBUM 100 POINTER |
| ALBUM 101 POINTER |
| ALBUM 102 POINTER |
| ALBUM 103 POINTER |
| ALBUM 104 POINTER |

Fig. 21B

| |
|---|
| FOLDER NUMBER |
| START TRACK NUMBER |
| LAST TRACK NUMBER |
| TOTAL TIME |
| RECORDED DATE AND TIME |
| NAME |
| ARTIST |
| HIGHLIGHT TRACK |
| TRACK 1 POINTER |
| TRACK 2 POINTER |
| TRACK 3 POINTER |
| TRACK 4 POINTER |
| TRACK 5 POINTER |

Fig. 21C

| |
|---|
| BELONGING FOLDER NUMBER |
| TRACK NUMBER |
| TOTAL TIME |
| RECORDED DATE AND TIME |
| NAME |
| ARTIST |
| ACCESSED DATE AND TIME |
| HIGHLIGHT POINTER |
| ISRC DATA |

Fig. 21D

| | |
|---|---|
| 1 | BELONGING FOLDER NUMBER |
| | TRACK NUMBER |
| | NUMBER OF REPRODUCTION TIMES |
| 2 | BELONGING FOLDER NUMBER |
| | TRACK NUMBER |
| | NUMBER OF REPRODUCTION TIMES |
| 3 | BELONGING FOLDER NUMBER |
| | TRACK NUMBER |
| | NUMBER OF REPRODUCTION TIMES |
| 4 | BELONGING FOLDER NUMBER |
| | TRACK NUMBER |
| | NUMBER OF REPRODUCTION TIMES |
| 5 | BELONGING FOLDER NUMBER |
| | TRACK NUMBER |
| | NUMBER OF REPRODUCTION TIMES |

START POINT

END POINT

START POINT          END POINT

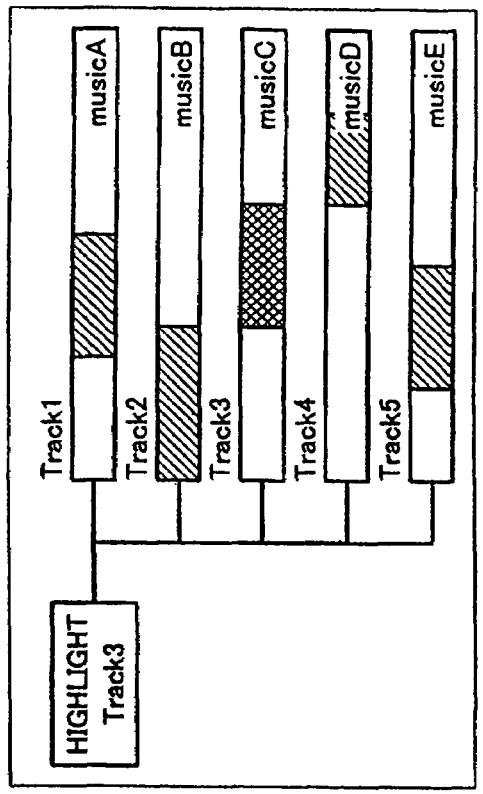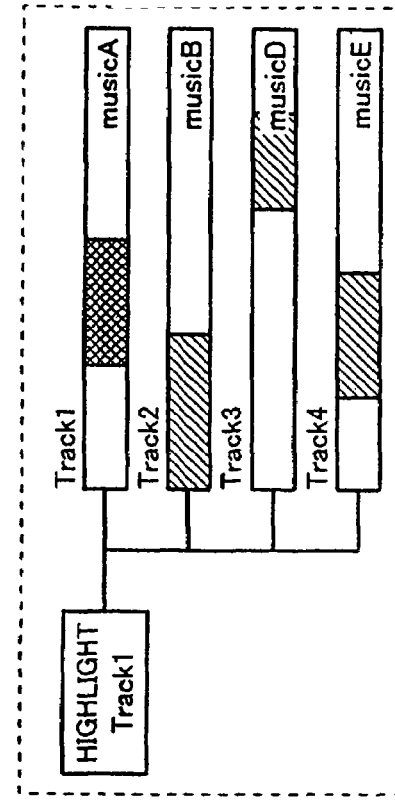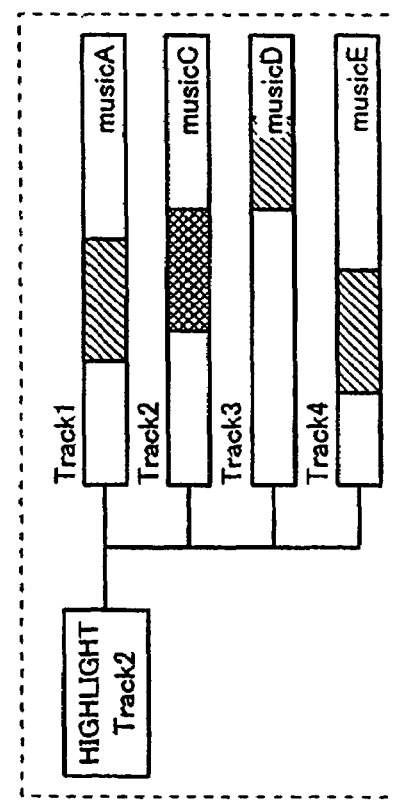

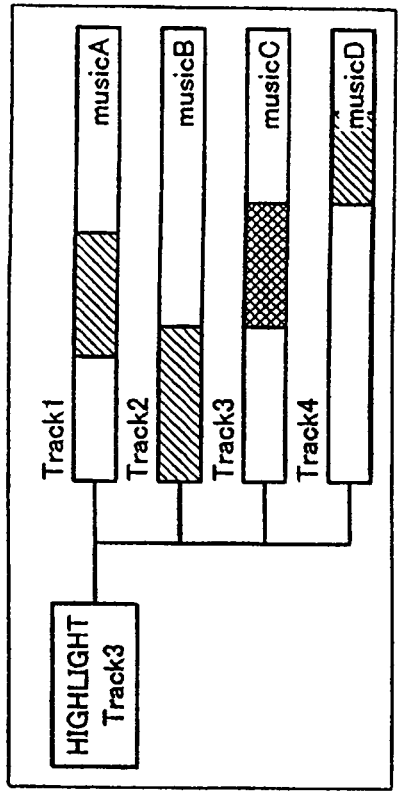
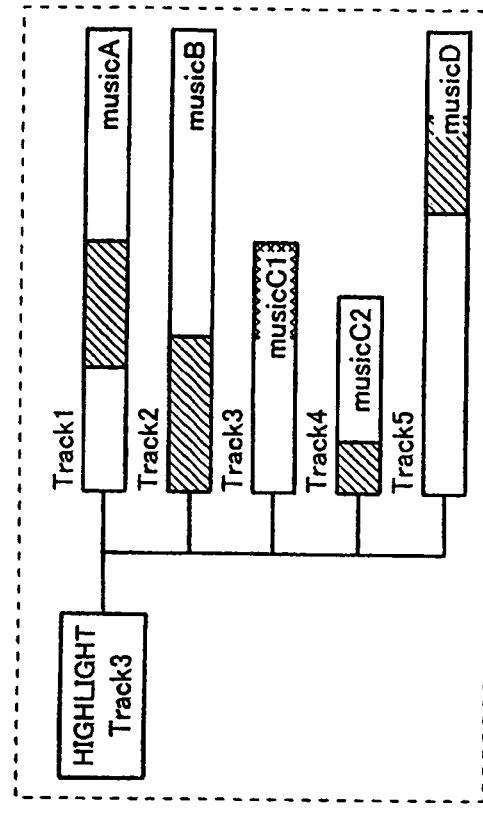
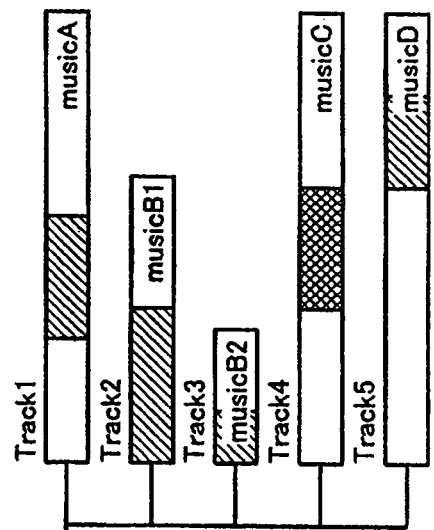

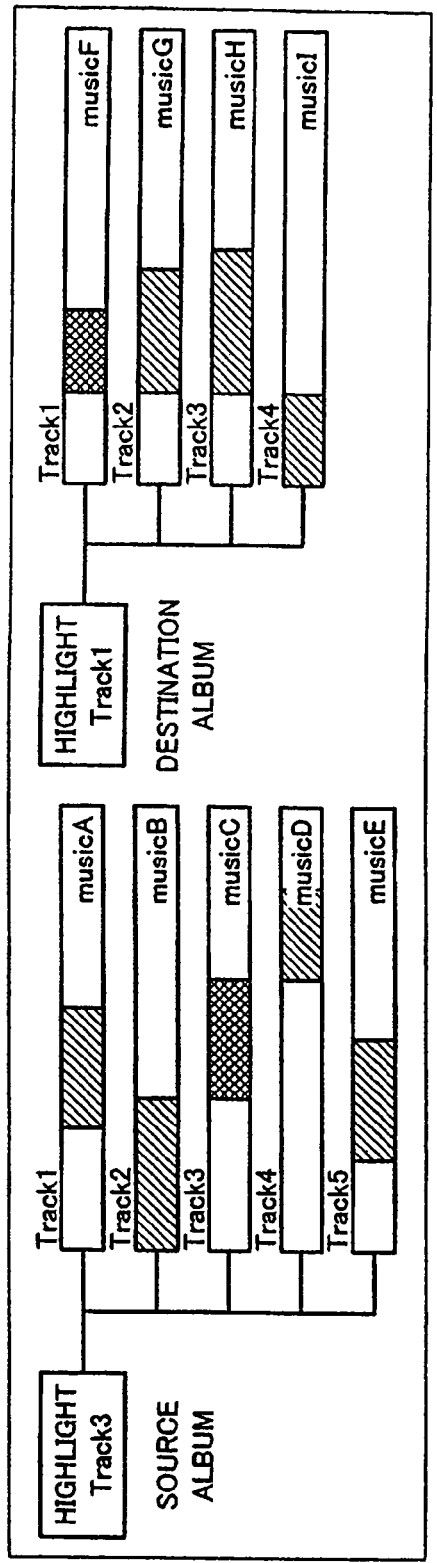
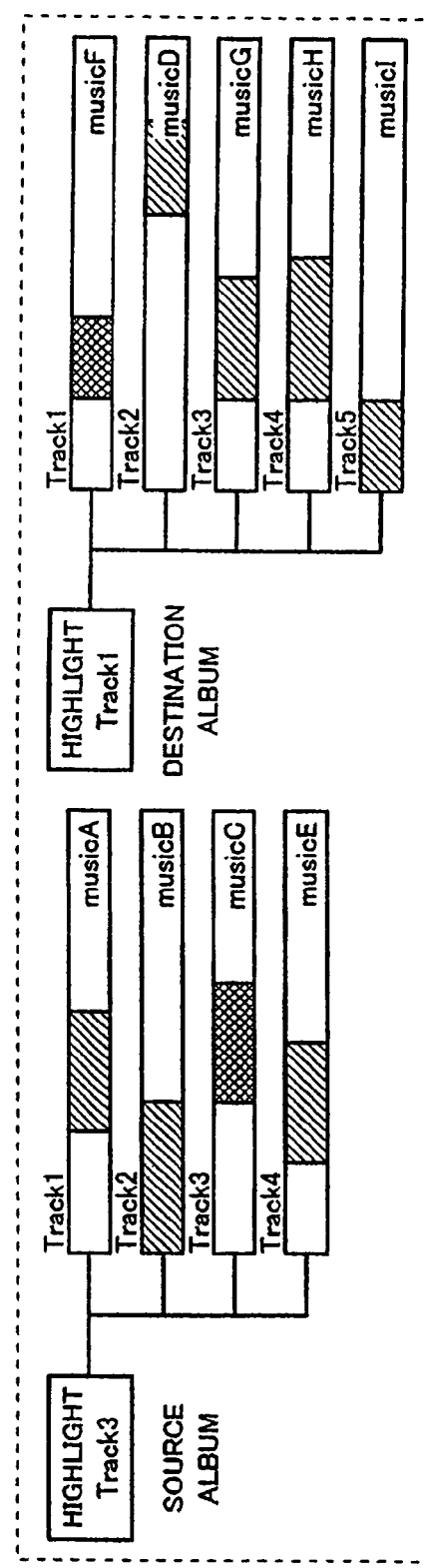

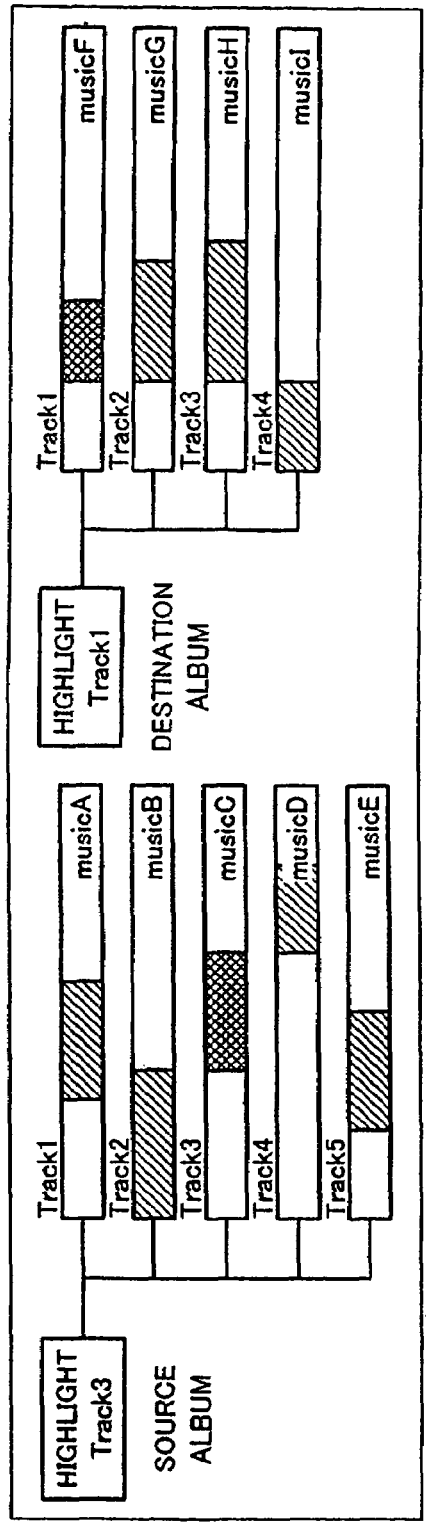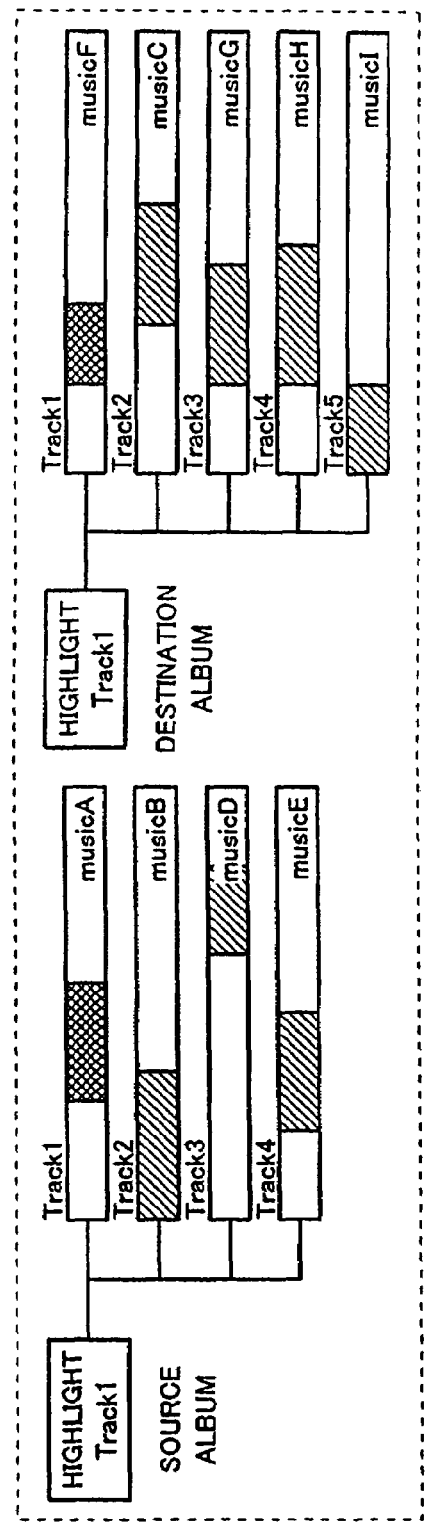

EDITING APPARATUS FOR OPTICAL DISC REPRODUCING DEVICE

CROSS REFERENCE TO RELATED APPLICATIONS

This application is a continuation of application Ser. No. 11/147,884 filed on Jun. 8, 2005, entitled EDITING APPARATUS FOR OPTICAL REPRODUCING DEVICE which, in turn, is a continuation of application Ser. No. 10/380,018, filed on Mar. 11, 2003, entitled EDITING APPARATUS FOR OPTICAL REPRODUCING DEVICE which, in turn, claims priority under 35 U.S.C. 371 and 37 CFR 1.495 to PCT/JP02/06406, filed Jun. 26, 2002, which, in turn, claims priority to Japanese application No. JP2001-211193 filed Jul. 11, 2001.

TECHNICAL FIELD

The present invention relates to a reproducing apparatus and an editing apparatus which allow a representative portion of a program to be registered.

BACKGROUND ART

In recent years, a method for temporarily storing a plurality of albums in a hard disk drive (HDD) and reproducing audio data therefrom has been commonly used. However, when a plurality of albums are stored in a HDD, it becomes difficult to select a desired album or a desired track and reproduce audio data therefrom.

To solve such a problem, a searching method for displaying album names or track names on a display and allowing the user to search them for his or her desired album or track on the display has been proposed.

However, when a large number of albums have been stored in the HDD, all album names and track names are not displayed on the screen at a time. Thus, the user should search them for his or her desired album name or track name while scrolling the screen. Thus, the user's operation for searching for his or her desired album or track is troublesome.

In addition, since the user should search them for his or her desired audio data with only character information, not in an intuitive manner, it takes a long time to do that.

In addition, when a large number of albums have been recorded in the HDD, the user often has a difficulty to know his or her desired album name or track name (music title). As a result, it was difficult for the user to do that.

Therefore, an object of the present invention is to provide a reproducing apparatus and an editing apparatus which allow the user to easily search for his or her desired album or track.

Another object of the present invention is to provide a reproducing apparatus and an editing apparatus which allow the user to intuitively search for his or her desired album or track.

A further object of the present invention is to provide a reproducing apparatus and an editing apparatus which allow the user to easily search for his or her desired album or track without need to know its name.

SUMMARY OF THE INVENTION

To solve the forgoing problems, one embodiment of the present invention is a reproducing apparatus comprising:

storage configured to store a plurality of programs being managed as a group, and management information including group information of programs;

an input unit configured to input a user's command;

a reproduction unit configured to reproduce a program;

a controller configured to control said reproduction unit to reproduce a highlight of a program in a group from a plurality of groups.

Another embodiment of the present invention is a method, performed in a reproducing apparatus comprising an input unit configured to input a user's command and a reproduction unit configured to reproduce a program, the method comprising acts of:

storing, in storage, a plurality of programs being managed as a group and management information including group information of programs; and controlling the reproduction unit to reproduce a highlight of a program in a group from a plurality of groups.

BRIEF DESCRIPTION OF DRAWINGS

FIG. 21 is a schematic diagram showing the structure of a database according to the embodiment of the present invention;

FIG. 30 is a schematic diagram showing an image for explaining an erase editing operation of the dubbing apparatus according to the embodiment of the present invention;

FIG. 31 is a schematic diagram showing an image for explaining a divide editing operation of the dubbing apparatus according to the embodiment of the present invention;

FIG. 32 is a schematic diagram showing an image for explaining a move editing operation of the dubbing apparatus according to the embodiment of the present invention;

FIG. 33 is a schematic diagram showing an image for explaining a move editing operation of the dubbing apparatus according to the embodiment of the present invention.

DETAILED DESCRIPTION

Figure 1:
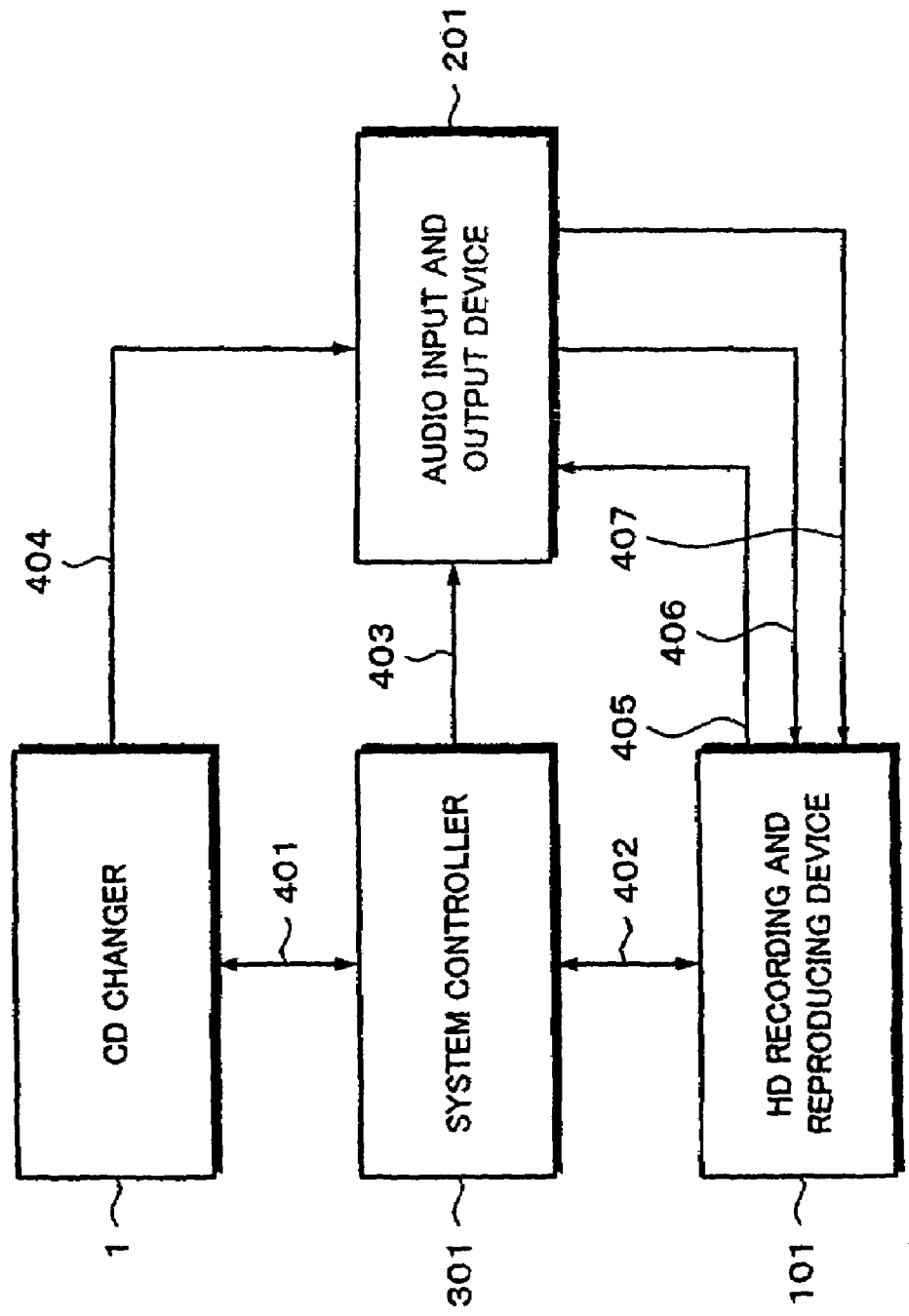
FIG. 1 is a block diagram showing an example of the overall structure of a dubbing apparatus according to an embodiment of the present invention.

Next, with reference to the accompanying drawings, an embodiment of the present invention will be described. FIG. 1 shows an example of the overall structure of a dubbing apparatus according to the embodiment of the present invention. The dubbing apparatus is composed of a CD changer 1, a hard disk recording and reproducing device (hereinafter referred to as HD recording and reproducing device) 101, an audio input and output device 201, and a system controller 301.

The CD changer 1 is connected to the system controller 301 through a cable 401. The HD recording and reproducing device 101 is connected to the system controller 301 through a cable 402. The audio input and output device 201 is connected to the system controller 301 through a cable 403. In addition, the CD changer 1 and the audio input and output device 201 are connected through a cable 404. In addition, the HD recording and reproducing device 101 and the audio input and output device 201 are connected through cables 405, 406, and 407.

Figure 2:
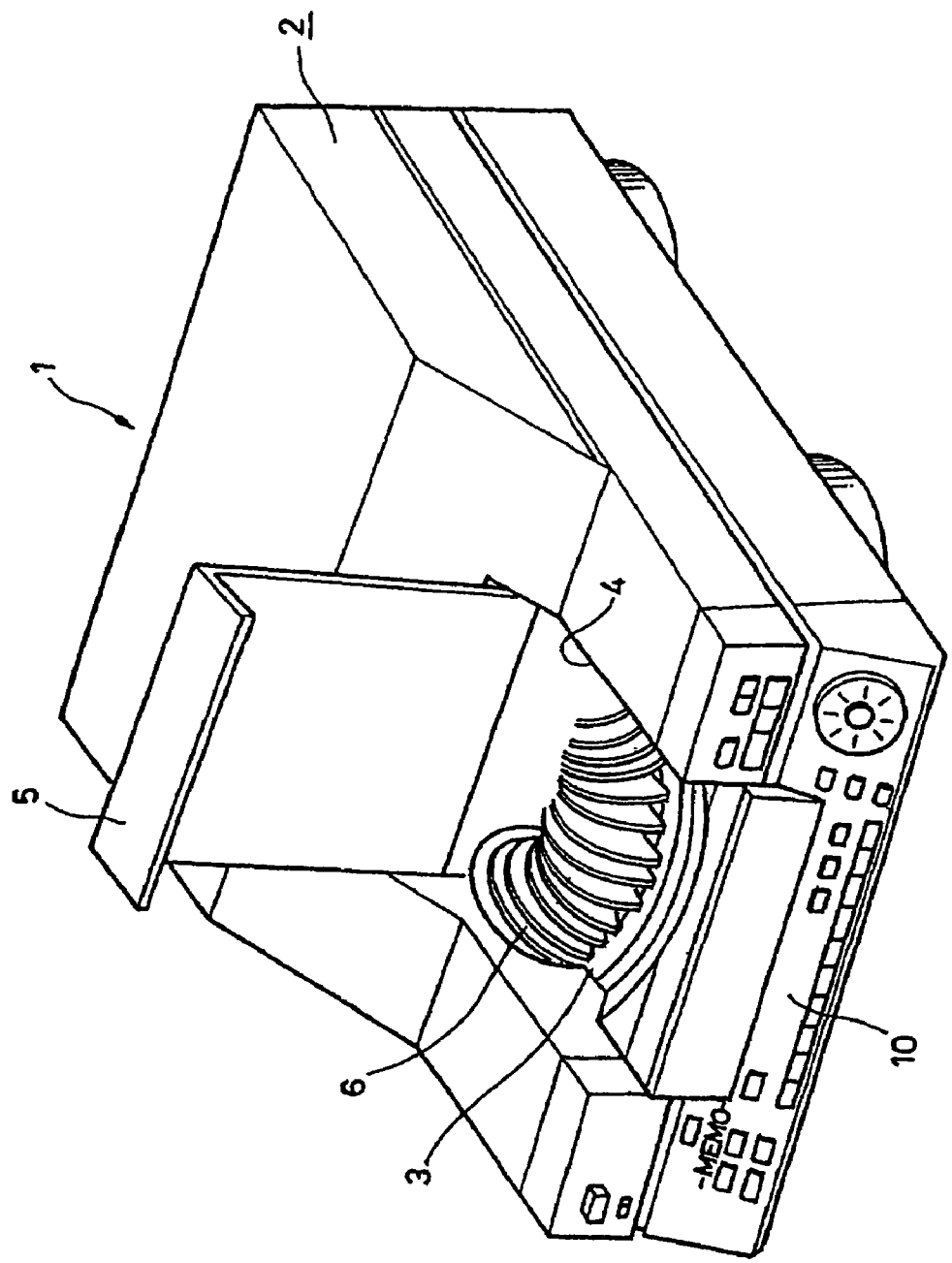
FIG. 2 is an external perspective view showing a CD changer according to the embodiment of the present invention.

FIG. 2 is an external perspective view showing the CD changer 1 according to the embodiment of the present invention. The CD changer 1 according to the embodiment of the present invention takes out one CD 6 from a disc loading unit 3 which loads many CDs 6 on which an information signal such as a music signal has been recorded. The CD changer 1 reproduces the information signal from the CD 6 which has been taken out.

An outer casing 2 of the CD changer 1 is formed nearly in a rectangular parallelopiped shape. The outer casing 2 encloses the disc loading unit 3 and a disc reproducing unit (not shown). The disc loading unit 3 loads up to 100 CDs 6. The disc reproducing unit reproduces an information signal from one CD 6 selected from the disc loading unit 3. The disc loading unit 3 has 100 slots (not shown) for CDs 6.

A disc loading/unloading opening 4 from and to which a CD 6 is loaded to and unloaded from the disc loading unit 3 is disposed on the outer casing 2 of the CD changer 1. The disc loading/unloading opening 4 is closed with a lid 5 composed of a transparent synthetic resin. Thus, when an information signal is reproduced from a CD 6 or when the CD changer 1 is not used, the disc loading/unloading opening 4 is closed with the lid 5 so as to prevent the user from unintentionally touching any CD 6 loaded in the disc loading unit 3 and dust from entering the inside of the outer casing 2.

In addition, as shown in FIG. 2, an operation panel 10 is disposed at the front of the outer casing 2. On the operation panel 10, operation switches, operation buttons, and so forth with which the CD changer 1 is operated are disposed.

Output terminals, control terminals, and so forth to which cables are connectable are disposed at the rear of the outer casing 2.

Figure 3:
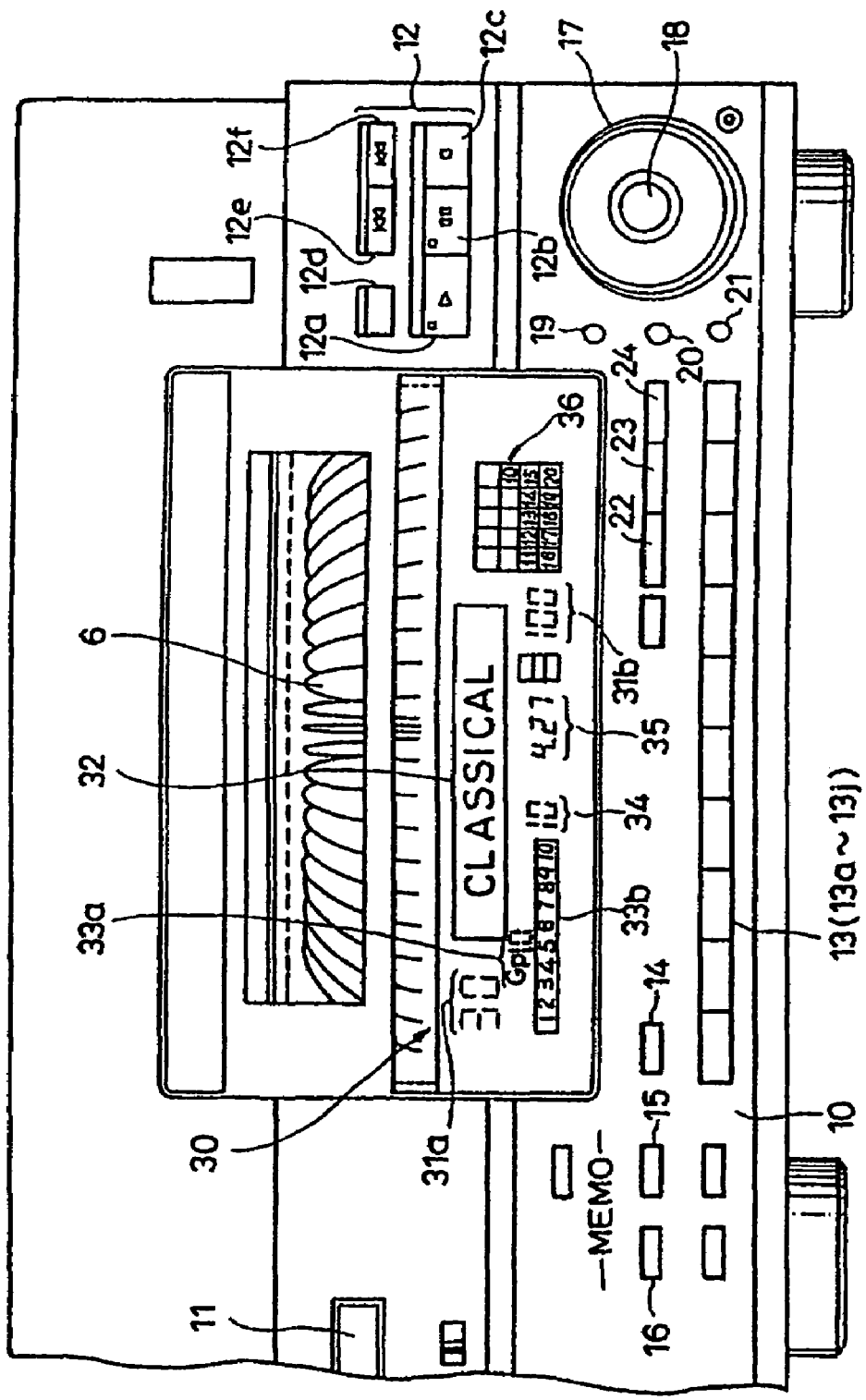
FIG. 3 is a front view showing the CD changer according to the embodiment of the present invention.

FIG. 3 is a front view showing the CD changer 1 according to the embodiment of the present invention. Next, with reference to FIG. 3, principal operation switches, operation buttons, and so forth disposed on the operation panel 10 will be described. As shown in FIG. 3, when viewed from the front of the operation panel 10, a power switch 11 is disposed at an upper left portion thereof. When viewed from the front of the operation panel 10, an operation key group 12 is disposed at an upper right portion thereof. The operation key group 12 is composed of a reproduction mode selection key 12a, a pause key 12b, a stop key 12c, an unload key 12d, a preview key 12e, and a next key 12f with which a reproduction operation mode for the CD 6 is selected. A disc group designation key 13 is disposed at a lower center portion of the operation panel 10. The disc group designation key 13 is used to designate 100 CDs 6 loaded in the disc loading unit 3 as groups each of which is composed of a predetermined number of CDs 6 corresponding to contents of recorded information or use frequencies of a plurality of users. According to the embodiment of the present invention, the disc group designation key 13 is composed of 10 keys which are a first disc group designation key 13a to tenth disc group designation key 13j. Above the disc group designation key 13a of the disc group designation key 13, a disc group entry key 14 is disposed. At the left of the disc group entry key 14, a selection key 15 is disposed. The selection key 15 is used to register character information with respect to a disc, a group, or a track. At the left of the selection key 15, a memo scan key 16 is disposed. The memo scan key 16 is used to successively display memo input information in a memo display area 32 of a display portion 30 which will be described later.

In the CD changer 1 according to the embodiment of the present invention, when viewed from the front of the operation panel 10 shown in FIG. 3, a jog key 17 is disposed at a lower right portion of the operation panel 10. The jog key 17 has a push button switch 18 which is used to set data which has been input. The jog key 17 has intermittent stop positions for example 10 stop position in one turn. At each stop position, data is updated. For example, when the jog key 17 is rotated for one stop position on the right, data is updated by +1. In contrast, when the jog key 17 is rotated for one stop position on the left, data is updated by −1. At the left of the jog key 17, a memory input key 19, a file key 20, and an erase key 21 are disposed.

On a right upper row of a lower center portion of the operation panel 10, mode setting keys are disposed. The mode setting keys are composed of a continue key 22, a shuffle key 23, and a program key 24. The user can select his or her desired reproduction mode with these keys.

At a center portion of the operation panel 10, the display portion 30 is disposed. The display portion 30 is composed of for example a liquid crystal display or an FL tube. The display portion 30 has a registered group display portion 31*a*, a disc group number display area 30*b*, the memo display area 32, first and second disc number display areas 33*a* and 33*b*, a track number display area 34, a time display area 35, and a remaining track display portion 36. The registered group display portion 31*a* displays a registered group number with a number which is lit. The disc group number display area 30*b* displays a group number of a selected disc or a current disc. The memo display area 32 displays a memo such as a title of a selected disc or a current disc. The first and second disc number display area 33*a* and 33*b* display a disc number of a CD 6 which is being reproduced or which has been selected and a disc number of a CD 6 from which an information signal will be reproduced next, respectively. The track number display area 34 displays a track number of a disc from which an information signal is being reproduced. The remaining track display portion 36 displays the remaining disc tracks besides a track number of a disc from which an information signal is being reproduced.

Figure 4:
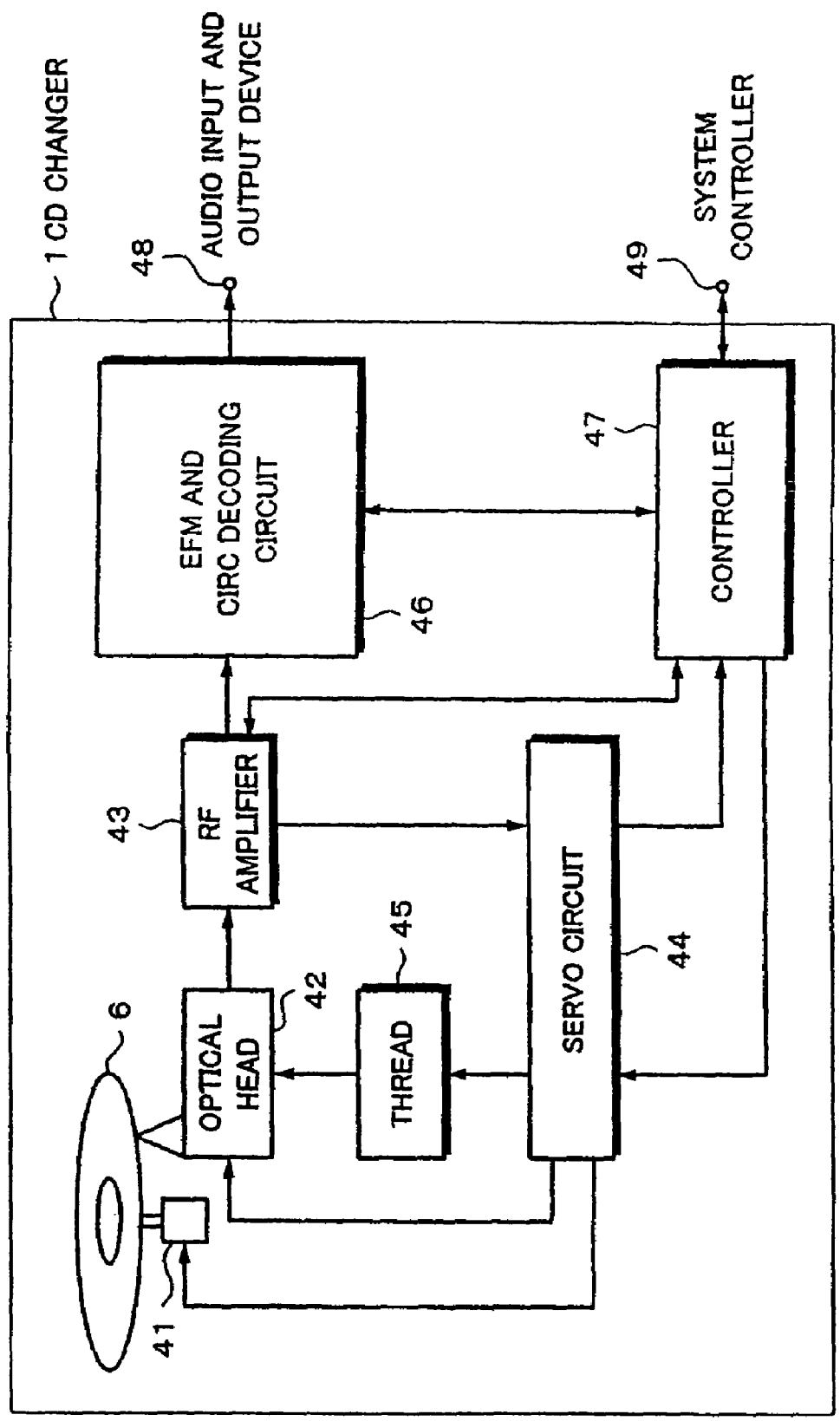
FIG. 4 is a block diagram showing an example of the structure of the CD changer according to the embodiment of the present invention.

FIG. 4 is a block diagram showing an example of the structure of the CD changer 1 according to the embodiment of the present invention. As shown in FIG. 4, the CD changer 1 comprises a spindle motor 41, an optical head 42, an RF (Radio Frequency) amplifier 43, a servo circuit 44, a thread 45, an EFM (Eight to Fourteen Modulation) and CIRC (Cross Interleave Reed-Solomon Code) decoding circuit 46, and a controller 47.

An output terminal 48 is connected to the audio input and output device 201 through the cable 404. A control terminal 49 is connected to the system controller 301 through the cable 401.

In a CD reproduction mode, a CD 6 loaded to the disc reproducing unit (not shown) is rotated and driven at constant linear velocity (CLV) by the spindle motor 41. In this example, the CD 6 is a reproduction-only disc.

The optical head 42 radiates laser light to a recoding surface of the CD 6 and receives the reflected light therefrom. As a result, the optical head 42 reads data recorded as pits on the CD 6 and supplies the data to the RF amplifier 43. The intensity of laser light is optimized by an APC (Automatic Power Control) (not shown). The optical head 42 is movable in tracking and focus directions. In addition, the optical head 42 is movable in the radius direction of the CD 6 corresponding to a signal supplied from the thread 45.

The RF amplifier 43 generates a reproduction RF signal, a focus error signal, and a tracking error signal corresponding to the signal supplied from the optical head 42. The focus error signal and the tracking error signal are supplied to the servo circuit 44. The reproduction RF signal is supplied to the EFM and CIRC decoding circuit 46.

The servo circuit 44 generates drive signals which are a focus drive signal, a tracking drive signal, a thread drive signal, and a spindle drive signal corresponding to the focus error signal and the tracking error signal supplied from the RF amplifier 43. Corresponding to these signals, the operations of the thread 45 and the spindle motor 41 are controlled.

The EFM and CIRC decoding circuit 46 digitizes the reproduction RF signal supplied from the RF amplifier 43 and obtains an EFM signal. The EFM and CIRC decoding circuit 46 performs an EFM demodulation and a CIRC decode for the EFM signal so that information which has been read from the optical disc is quantized with 16 bits (BInary digit (bit)) and sampled at 44.1 kHz is decoded to a digital signal. The digital signal is supplied to the audio input and output device 201 through the cable 404 connected to the output terminal 48.

The CIRC decode is an error detecting process and an error correcting process which use a CIRC. In reality, the CIRC decode is an error detecting process and an error correcting process using C1 and C2 codes.

The EFM and CIRC decoding circuit 46 extracts control data such as TOC (Table Of Contents) and a sub code (which will be described later) from the reproduction RF signal supplied from the RF amplifier 43 and supplies the extracted control data to the controller 47.

The controller 47 controls each portion corresponding to data such as TOC and sub code supplied from the EFM and CIRC decoding circuit 46. In addition, the controller 47 transmits control data such as TOC and sub code to the system controller 301 through the cable 401 connected to the control terminal 49. In addition, the controller 47 receives for example a control signal from the system controller 301 through the cable 401 connected to the control terminal 49. Corresponding to the received control signal, the controller 47 controls each portion of the CD changer 1. In addition, the controller 47 is connected to the operation switches, operation buttons, and so forth (not shown). Corresponding to signals supplied from these operation switches and operation buttons, the controller 47 controls each portion of the CD changer 1.

Figure 5:
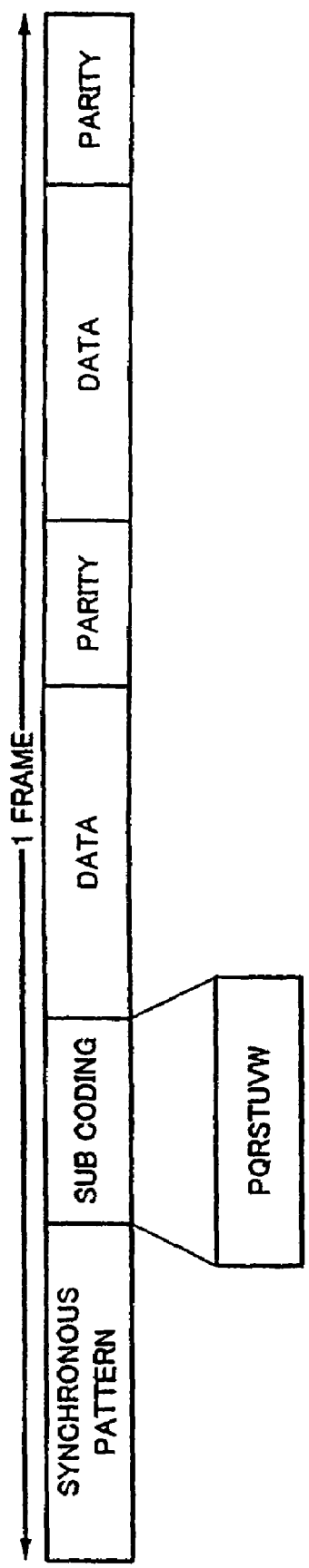
FIG. 5 is a schematic diagram showing an example of the structure of a frame of a CD.

FIG. 5 shows the structure of a frame of data generated by the EFM and CIRC decoding circuit 46 and supplied to the controller 47 shown in FIG. 4. As shown in FIG. 5, one frame is composed of a synchronous pattern portion (24 channel bits), a sub coding portion (one symbol, namely 14 channel bits), a first data portion (12 symbols, namely 12×14 channel bits), a first parity portion (4 symbols, namely 4×14 channel bits), a second data portion (12 symbols, namely 12×14 channel bits), and a second parity portion (4 symbols, namely 4×14 channel bits). In this example, one frame contains three connection bits for connecting each symbol (assuming that a synchronous pattern is a symbol composed of 24 bits). Thus, the total number of connection bits are 34×3=102 channel bits. Consequently, one frame is composed of a total of 588 channel bits.

Figures 6, 7:
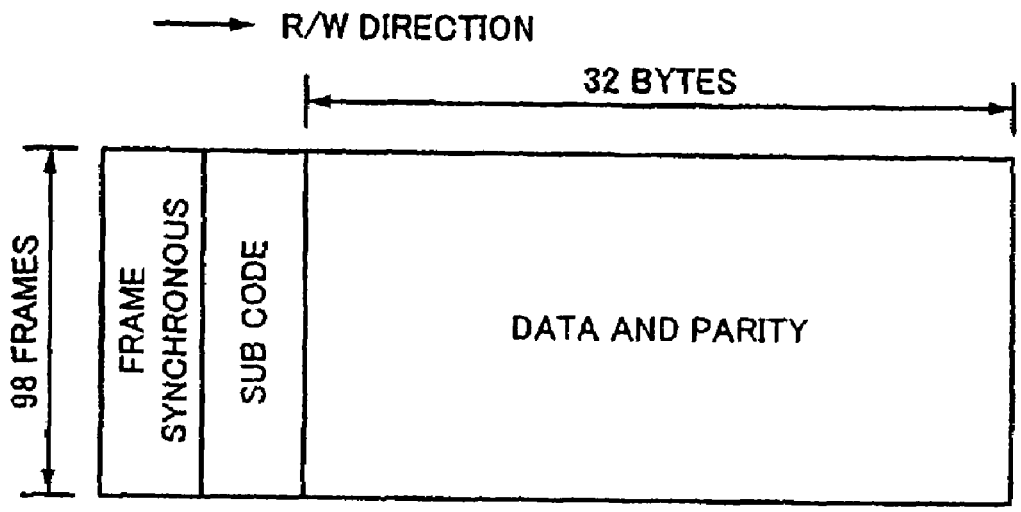
FIG. 6 is a schematic diagram showing an example of the structure of the format of a sub code of a CD.
FIG. 7 is a schematic diagram showing an example of the structure of a frame of a sub code of a CD.

As shown in FIG. 6, 98 frames form one block of information composed of frame synchronous information, sub code information, data, and parity information (this block of information is referred to as sub code frame). Sub code data of 98 frames represents sub code information of one block. Next, with reference to FIG. 7, such a block will be described. Sub codes of a first frame F1 and a second frame F2 are composed of fixed synchronous patterns S0=00100000000001 and S1=00000000010010, respectively. As S0 and S1, patterns which do not take place in an EFM modulation are used. Thus, when data is reproduced, with the fixed synchronous patterns S0 and S1, a start position of a block of sub code information is detected.

Sub codes of 96 frames of third frame F3, fourth frame F4, . . . , 97-th frame F97, and 98-th frame F98 are composed of P1, Q1, R1, S1, T1, U1, V1, and W1, P2 to W2, . . . , P95 to W95, and P96 to W96, respectively. Rows of P1, P2, . . . , and P96, Q1, Q2, . . . and Q96, R1 to R96, S1 to S96, T1 to T96, U1 to U96, V1 to V96, and W1 to W96 each form complete information channels.

Such sub code information contains (1) information with respect to such as music program start position detection and programming reproduction function and (2) additional information of text information. As the information (1), P channel and Q channel of sub codes are used. As the information (2), R channel to Q channel are used. P channel represents a pause between two music programs. P channel is used to coarsely detect the beginning of a music program. In contrast, Q channel is used to more finely control the detection of the music program start position.

Figure 8:
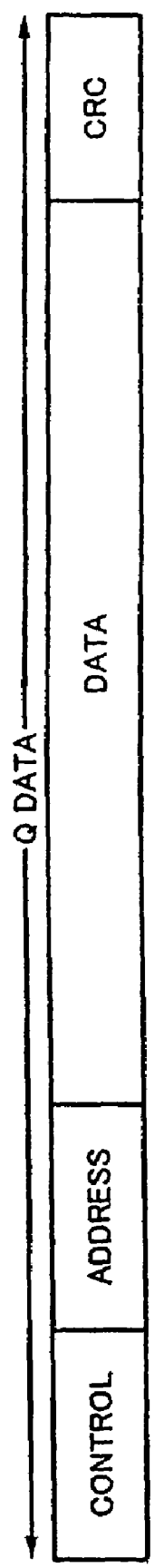
FIG. 8 is a schematic diagram showing an example of the structure of Q data of a sub code.

FIG. 8 shows an example of contents of Q data. As shown in FIG. 8, Q data is composed of a control portion, an address portion, a data portion, and a CRC (Cyclic Redundancy Code) portion.

The control portion is composed of four bits Q1 to Q4 in which data which represents the number of audio channels, an emphasis, digital data, and so forth has been recorded.

The address portion is composed of four bits Q5 to Q8 in which a control signal which represents a format and a type of data of the data portion which will be described later has been recorded.

The CRC portion is composed of 16 bits Q81 to Q96 in which data for detecting an error with a cyclic code has been recorded.

Figure 9:
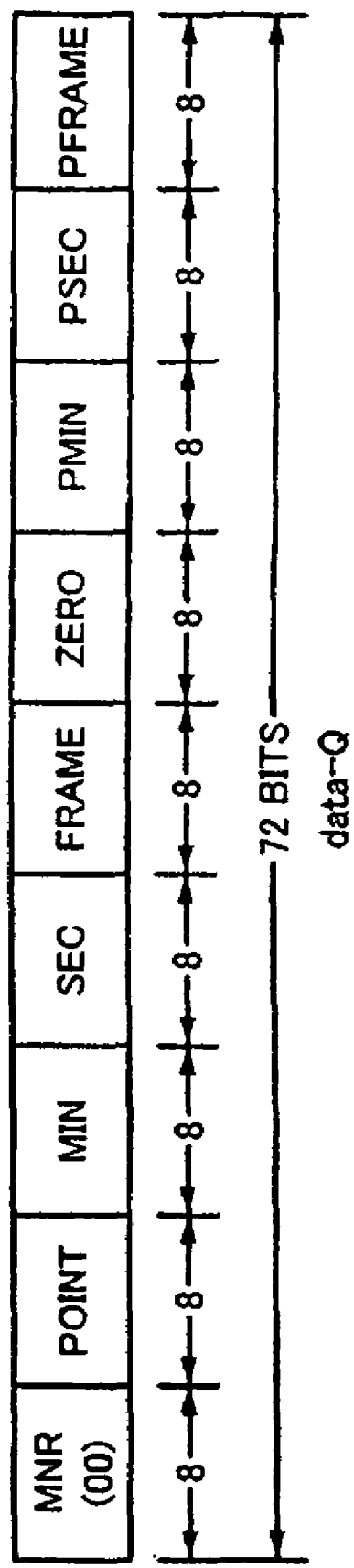
FIG. 9 is a schematic diagram showing an example of the structure of a data portion of Q data.

As shown in FIG. 9, the data portion is composed of 72 bits Q9 to Q80. When the four-bit data of the address portion is "0001", the data portion (TOC (Table Of Contents) of the lead-in area of the CD 6 has the structure as shown in FIG. 9. In other words, as shown in FIG. 9, the data portion is composed of a MNR portion (music program number portion), a POINT portion, an MIN portion (elapsed time minute component portion), a SEC portion (elapsed time second component portion), a FRAME portion (elapsed time frame number portion), a ZERO portion, a PMIN portion (absolute time minute component portion), a PSEC (absolute time second component portion), and a PFRAME portion (absolute time frame number portion). Each of these portions is composed of eight-bit data.

Each of the MNR portion, the MIN portion, the SEC portion, the FRAME portion, and the ZERO portion are fixed to "00" in hexadecimal notation. Thus, all eight bits of each of these portions are "0".

When the POINT portion is "A0" in hexadecimal notation, it represents the first music program number or the first movement number. When the POINT portion is "A1" in hexadecimal notation, it represents the last music program number or the last movement number. When the POINT portion is "A2" in hexadecimal notation, the PMIN portion (absolute time minute component portion), the PSEC portion (absolute time second component portion), and the PFRAME portion (absolute time frame number portion) represent absolute time (PTIME) at which the lead-out area starts.

When the POINT portion is represented in two-digit BCD, the PMIN portion (absolute time minute component portion), the PSEC portion (absolute time second component portion), and the PFRAME portion (absolute time frame number portion) represent an address in absolute time (PTIME) at which a music program or a movement represented by their values starts.

Figure 10:
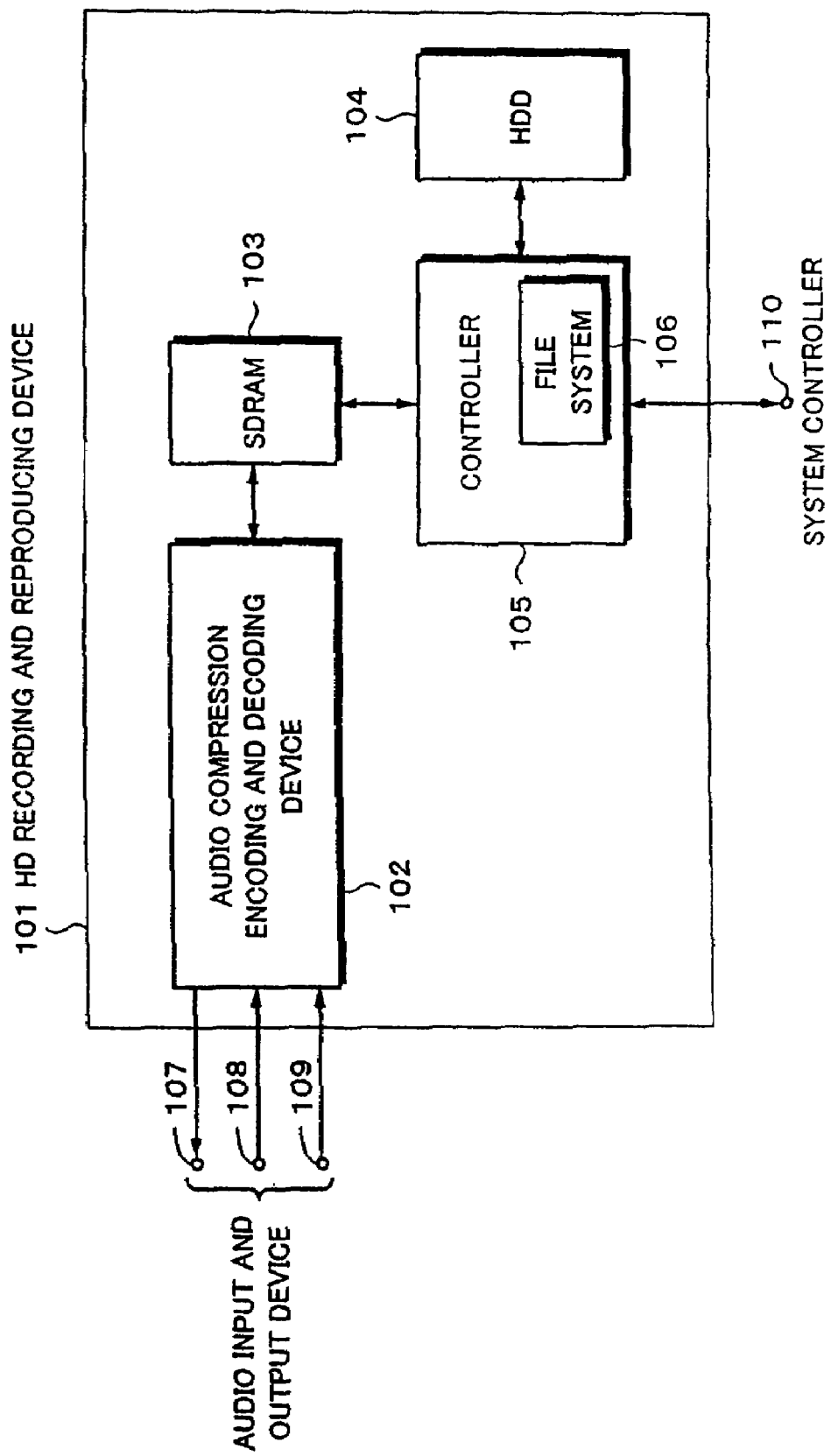
FIG. 10 is a block diagram showing an example of the structure of a HD recording and reproducing device according to the embodiment of the present invention.

FIG. 10 is a block diagram showing the structure of the HD recording and reproducing device 101 according to the embodiment of the present invention. The HD recording and reproducing device 101 comprises an audio compression encoding and decoding device 102, an SDRAM (Synchronous Dynamic Random Access Memory) 103, an HDD 104, and a controller 105.

An output terminal 107, an input terminal 108, and an input terminal 109 are connected to the audio input and output device 201 through the cable 405, the cable 406, and the cable 407, respectively. In addition, a control terminal 110 is connected to the system controller 301 through the cable 402.

The audio compression encoding and decoding device 102 compresses audio data which is supplied from the audio input and output device 201 to the HD recording and reproducing device 101 through the cable 406 connected to the input terminal 108 corresponding to ATRAC3 (Adaptive Transform Acoustic Coding 3) and supplies the compressed audio data to the controller 105 through the SDRAM 103. Likewise, the audio compression encoding and decoding device 102 processes audio data supplied from the audio input and output device 201 to the HD recording and reproducing device 101 through the cable 407 connected to the input terminal 109. It should be noted that the data compressing system is not limited to ATRAC3. Instead, MP3 (MPEG-1 audio layer 3), WMA (Windows (registered trademark) Media Audio), AAC (Advanced Audio Coding), TwinVQ (Tranform-domain Weighted Interleave Vector Quantization), or the like can be used.

In addition, the audio compression encoding and decoding device 102 decompresses ATRAC3 compressed data supplied from the controller 105 through the SDRAM 103 and supplies the decompressed data to the audio input and output device 201 through the cable 405 connected to the output terminal 107.

The SDRAM 103 is a storing device. In reality, the SDRAM 103 is a storing device which is used when data encoded or to be decoded by the audio compression encoding and decoding device 102 is exchanged with the HDD 104 through the controller 105.

The controller 105 controls each portion of the HD recording and reproducing device 101. The controller 105 has a file system 106 as an internal system. With the file system 106, a process for accessing the HDD 104 and reading a file therefrom and a process for accessing the HDD 104 and writing a file thereto can be performed. According to the embodiment of the present invention, a file allocation table file system (hereinafter referred to as FAT FS) is used as a file system.

Originally, the FAT FS was used on DISK BASIC. Since 1977, the FAT FS has been widely used on MS-DOS® and Windows®.

The FAT FS is a system which divides a disk area into clusters, assigns numbers thereto, and manages programs and data with assigned cluster numbers. The FAT has variations such as FAT12, FAT16, FAT32, and so forth which differ in the number of clusters which can be managed.

The FAT12 was initially used in MS-DOS. The FAT12 manages clusters with 12 bits. Thus, the FAT12 can manage $2^{12}=4096$ (actually, 4085 (FFF5h)) clusters. In other words, the maximum storage capacity which the FAT12 can manage is 32 kB (upper limit value of each cluster)×4096=128 MB.

The FAT16 was used in MS-DOS ver. 4.x. The FAT16 manages clusters with 16 bits. Thus, the FAT16 can manage $2^{16}$=65536 (actually, 65525 (FFF5h)) clusters. In other words, the maximum storage capacity which the FAT16 can manage is 32 KB (upper limit value of each cluster)×65536=2 GB.

The FAT32 has been used since WINDOWS® OSR 2.0. The FAT32 manages clusters with 32 bits. Thus, the FAT32 can manage $2^{32}$ clusters. However, since the FAT32 actually manages clusters with 28 bits, it can manage $2^{28}$=268435445 (FFFFFF5h) clusters.

According to the embodiment of the present invention, as the FAT FS, VFAT32 is used. The VFAT32 is an FAT FS used in WINDOWS® 95 which allows a long file name to be assigned to each file with compatibility with the FAT FS of MS-DOS.

Figure 11:
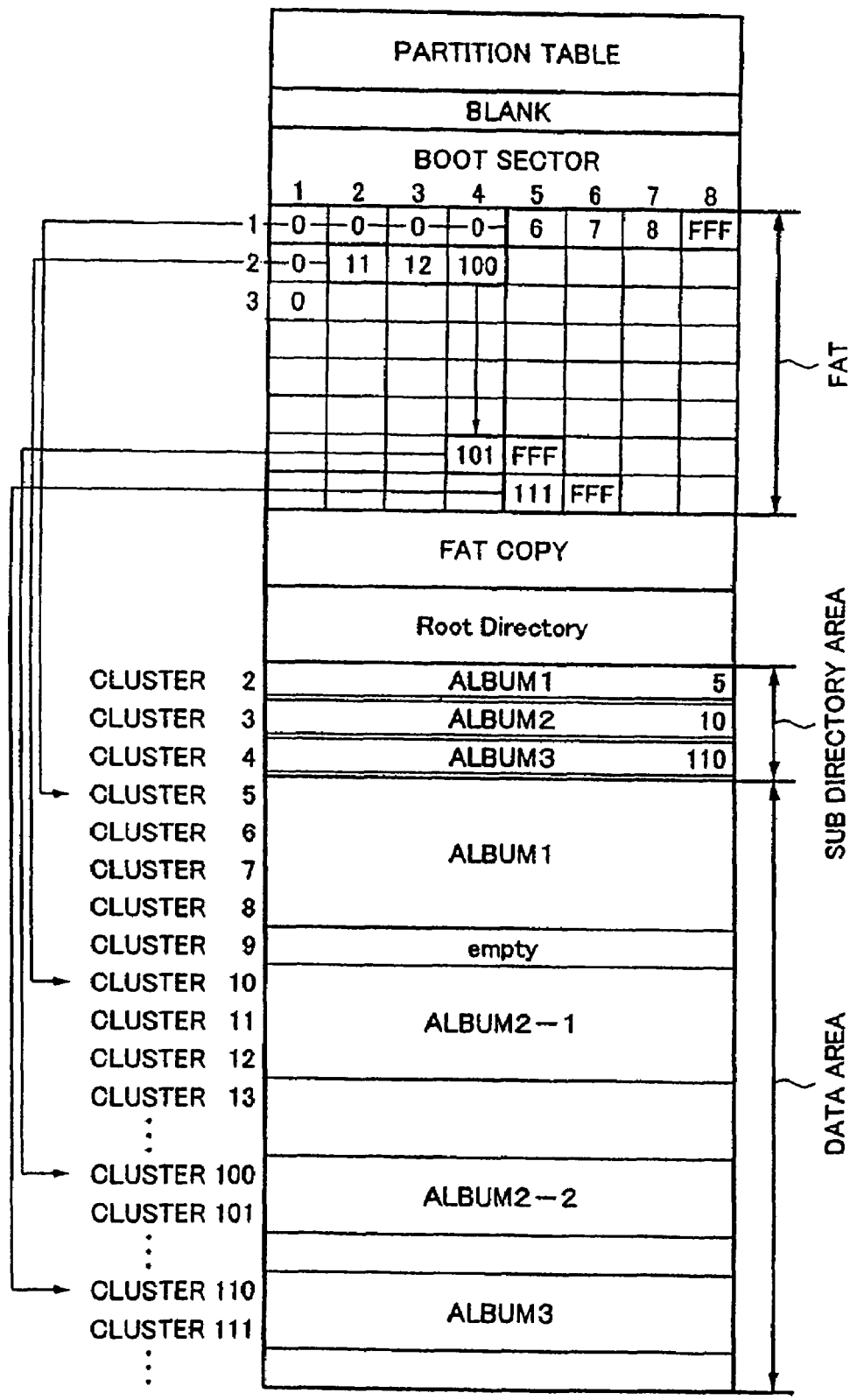
FIG. 11 is a schematic diagram showing a hard disk of the HD recording and reproducing device according to the embodiment of the present invention.

Next, with reference to FIG. 11, a managing method using FAT will be described. FIG. 11 is a schematic diagram showing a hard disk of the HDD 104. The hard disk has a partition table portion, a blank area, a boot sector, an FAT area, an FAT backup area, a root directory area, a sub directory area, and a data area which are successively layered.

The boot sector, the FAT area, the FAT backup area, the root directory area, the sub directory area, and the data area together are referred to as FAT partition area.

In the partition table portion, start and end addresses of the FAT partition area have been recorded. A FAT used in a floppy disk does not have the partition table portion. Thus, since the first track is used for only the partition table, the first track of a floppy disk has a blank area.

In the boot sector, a size of an FAT structure which is 12-bit FAT, 16-bit FAT, or 32-bit FAT, a cluster size, and a size of each area have been recorded.

The FAT is used to manage positions of files recorded in the data area. The FAT backup area is an area for a backup of the FAT.

In the root directory portion, directory entries which contain information with respect to sub directories and so forth have been recorded.

Figure 12:
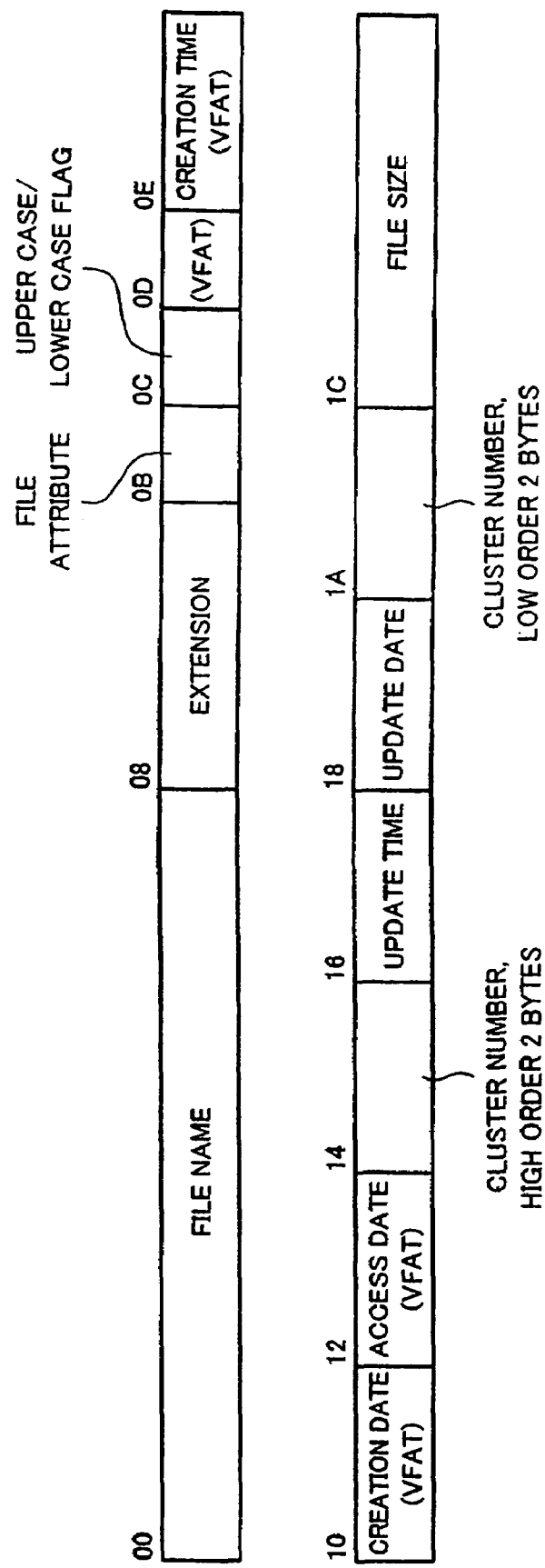
FIG. 12 is a schematic diagram showing the structure of a directory entry according to the embodiment of the present invention.

FIG. 12 shows an example of the structure of a directory entry according to the VFAT32. As shown in FIG. 12, a directory entry is composed of a file name, an extension, a file attribute, an upper case/lower case flag, a creation time, a creation date, Accessed date and time, a cluster number (high order two bytes), an update time, an update date, a cluster number (low order two bytes), a file size, and so forth.

The file name (alias name) and the extension are areas in which a short name (eight-character file name and three-character extension) is stored. When the file name and the extension are less than eight characters and three characters, respectively, 0x20 is filled. When the start byte is 0xE5, it represents a file which has been erased. When the start byte is 0x01, it represents 0xE5. A volume label is recorded with a total of 11 bytes of the file name and the extension.

The file attribute is an area in which an attribute of a file is stored. The attribute has values 0x01 (read only), 0x02 (hidden file), 0x04 (system file), 0x08 (volume label), 0x10 (directory), and 0x20 (normal file).

The creation time, the creation date, and the access date are areas which have been reserved in the conventional FAT. These areas have the same binary format as the conventional FAT.

The cluster number is an area in which a start cluster number is recorded. As shown in FIG. 12, the cluster number is composed of two areas in which high order two bytes and low order two bytes are recorded, respectively.

The update time is an area in which time at which a file has been updated is stored. The update time has a bit field HHH-HHmmm mmmssss where hhhhh is (hour) (0 to 23), mmmmmm is (minute) (0 to 59), and ssss is (second) (0 to 29, which are actually doubled).

The update date is an area in which an updated date is stored. The update date has a bit field YYYYYYYM MMMDDDDD where YYYYYYY is (year) (0 to 99, after 1980), MMMM is (month) (January to December), and DDDDD is (1 to 31).

The file size is an area in which the size of a file is stored.

In the sub directory portion, sub directory entries have been recorded. In a sub directory entry, a file name and a record position on the FAT are managed. In FIG. 11, in a sub directory entry in which a file name album 1 has been recorded, address "5" on the FAT has been managed. In a sub directory entry in which file name album 2 has been recoded, address "10" on the FAT has been managed. In addition, in a sub directory entry in which file name album 3 has been recorded, address "110" on the FAT has been managed.

In the data area, real data after cluster 5 has been recorded. According to the embodiment of the present invention, in the data area, audio data which has been compressed corresponding to ATRAC3 is recorded.

According to the embodiment of the present invention, album 1 which is audio data compressed corresponding to ATRAC3 has been recorded in clusters 5, 6, 7, and 8. Album 2-1 which is a first part of album 2 as audio data compressed corresponding to ATRAC3 has been recorded in clusters 10, 11, and 12. Album 2-2 which is a second part of album 2 as audio data compressed corresponding to ATRAC3 has been recorded in clusters 100 and 101. In addition, album 3 which is audio data compressed corresponding to ATRAC3 has been recorded in clusters 110 and 111.

Album 2 has been divided into two portions and dispersedly recorded. In the data area, an area denoted by empty is a recordable area.

Next, a process for reading each of album 1, album 2, and album 3 will be described. In this example, the root directory area has a root directory entry which contains file name "album 1", cluster number "2", and so forth, a root directory entry which contains file name "album 2", cluster number "3", and so forth, and a root directory entry which contains file name "album 3", cluster number "3", and so forth.

First of all, a process for reading a file of album 1 will be described. With address "2" recorded as a cluster number of a directory entry for album 1, cluster number 2 is accessed in the sub directory area. With address "5" recorded as a cluster number of a sub directory entry for album 1, the FAT is searched for an entry address. With reference to entry address "5", cluster address "6" is obtained. With reference to entry address "6", cluster address "7" is obtained. With reference to entry address "7", cluster address "8" is obtained. With reference to entry address "8", an end code "FFF" is obtained.

Thus, the file of album 1 uses clusters 5, 6, 7, and 8 of the cluster area. With reference to clusters 5, 6, 7, and 8 of the data area, an area for ATRAC3 data of album 1 can be accessed.

Next, a method for searching a file of album 2 which has been dispersedly recorded will be described. With address "3" recorded as a file name of a directory entry for album 2, cluster number "3" is accessed in the sub directory area. With address "10" recorded as a cluster number of a sub directory entry for album 2, the FAT is searched for an entry address. With reference to entry address "10", cluster address "11" is obtained. With reference to entry address "11" cluster address "12" is obtained. With reference to entry address "12", cluster address "100" is obtained. With reference to entry address "101", an end code "FFF" is obtained.

Thus, the file of album 2 uses clusters 10, 11, 12, 100, and 101. With reference to clusters 10, 11, and 12 in the data area, an area for ATRAC3 data of a first half part of the file of album 2 can be accessed. In addition, with reference to clusters 100 and 101 of the data area, an area for ATRAC3 data of a second half part of the file of album 2 can be accessed.

Last, a process for reading a file of album 3 will be described. With address "4" recorded as a cluster number of a directory entry for album 3, a cluster number "4" is accessed in the sub directory area. With address "110" recorded as a cluster number of a sub directory entry for album 3, the FAT is searched for an entry address. With reference to entry address "110", cluster address "111" is obtained. With reference to entry address "111", an end code "FFF" is obtained.

Thus, the file of album 3 uses clusters 10 and 111. With reference to clusters 10 and 111 in the data area, an area for ATRAC3 data of album 3 can be accessed.

In such a manner, data files which have been dispersedly recorded on the HD can be combined and sequentially reproduced.

In the forgoing example, three sub directories have been recorded in directory entries of the root directory. However, it should be noted that the present invention can be applied to the case that more than three sub directories have been recorded.

In addition, the controller 105 stores an address pointer and so forth of audio data to the HDD 104 corresponding to a signal supplied from a controller 302. For example, the controller 105 stores a track start pointer, a track end pointer, and track information to the HDD 104 corresponding to a signal supplied from the controller 302. The track information is composed of for example a track number, a folder number (virtual slot number), and play time. The folder number (virtual slot number) is a folder number of a folder created in the HDD 104. Folders (virtual slots) will be described later in detail.

Figure 13:
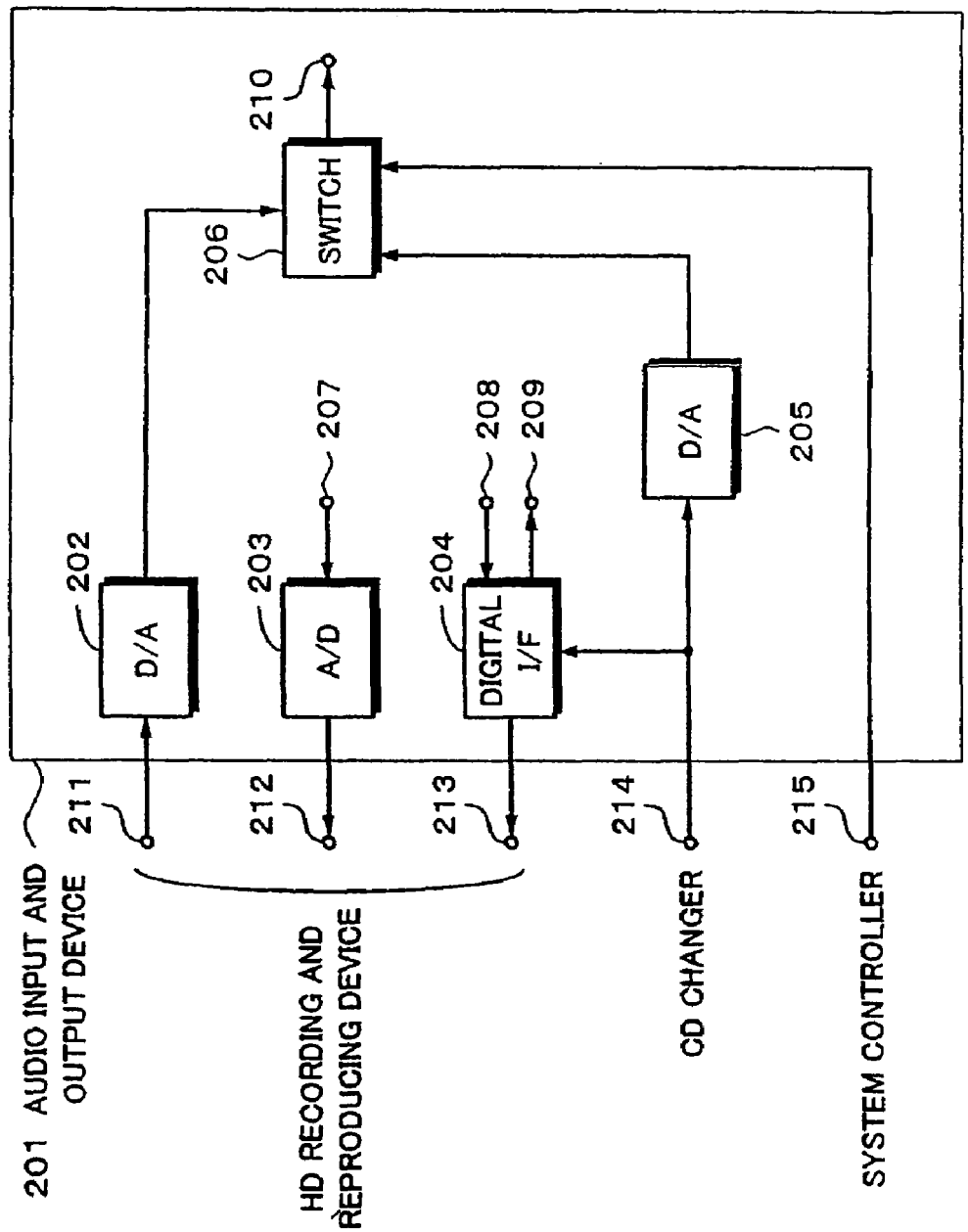
FIG. 13 is a block diagram showing an example of the structure of an audio input and output device according to the embodiment of the present invention.

FIG. 13 is a block diagram showing the structure of the audio input and output device 201 according to the embodiment of the present invention. As shown in FIG. 13, the audio input and output device 201 is composed of a D/A converter 202, an A/D converter 203, a digital interface (hereinafter referred to as digital I/F) 204, a D/A converter 205, and a switch 206.

An input terminal 207, an input terminal 208, an output terminal 209, and an output terminal 210 are connected to an external device or the like through respective cables (not shown).

An input terminal 211 is connected to the output terminal 107 of the HD recording and reproducing device 101 through the cable 405. An output terminal 212 is connected to the input terminal 108 of the HD recording and reproducing device 101 through the cable 406. An output terminal 213 is connected to the input terminal 109 of the HD recording and reproducing device 101 through the cable 407. An input terminal 214 is connected to the output terminal 48 of the CD changer 1 through the cable 404. A control terminal 215 is connected to the system controller 301 through the cable 403.

The D/A converter 202 converts a digital audio signal supplied from the HD recording and reproducing device 101 to the audio input and output device 201 through the cable 405 connected to the input terminal 211 into an analog audio signal and supplies the analog audio signal to the switch 206.

With a sampling frequency of 44.1 kHz and 16 quantizing bits, the A/D converter 203 digitizes an analog audio signal supplied from an external device or the like to the audio input and output device 201 through a cable (not shown) connected to the input terminal 207 and supplies the digitized signal to the HD recording and reproducing device 101 through the cable 406 connected to the output terminal 212.

The digital I/F 204 supplies a digital audio signal supplied from an external device or the like to the audio input and output device 201 through a cable (not shown) connected to the input terminal 208 to the HD recording and reproducing device 101 through the cable 407 connected to the output terminal 213.

In addition, the digital I/F 204 supplies a digital audio signal supplied from the CD changer 1 to the audio input and output device 201 through the cable 404 connected to the input terminal 214 to the HD recording and reproducing device 101 through the cable 407 connected to the output terminal 213. Thus, digital CD reproduction data which is output from the CD changer 1 can be recorded to the HD recording and reproducing device 101.

In addition, the digital I/F 204 outputs a digital audio signal supplied from the CD changer 1 to the audio input and output device 201 through the cable 404 connected to the input terminal 214 to an external device or the like through a cable (not shown) connected to the output terminal 209. Thus, digital CD reproduction data can be output to an external device or the like.

The D/A converter 205 converts a digital audio signal supplied from the CD changer 1 to the audio input and output device 201 through the cable 404 connected to the input terminal 214 into an analog audio signal and supplies the analog audio signal to the switch 206.

The switch 206 is controlled corresponding to a signal supplied from the system controller 301 to the audio input and output device 201 through the cable 403 connected to the control terminal 215. In reality, when the CD changer 1 is operated in the reproduction mode, the switch 206 selects the D/A converter 205 corresponding to a signal supplied from the system controller 301 to the audio input and output device 201 through the cable 403 connected to the control terminal 215. Thus, an analog signal which is output from the D/A converter 205 is supplied to the output terminal 210.

When the HD recording and reproducing device 101 is operated in the reproduction mode, the switch 206 selects the D/A converter 202 corresponding to a signal supplied from the system controller 301 to the audio input and output device 201 through the cable 403 connected to the control terminal 215. In other words, the switch 206 supplies an analog audio signal supplied from the D/A converter 202 to the output terminal 210.

Figure 14:
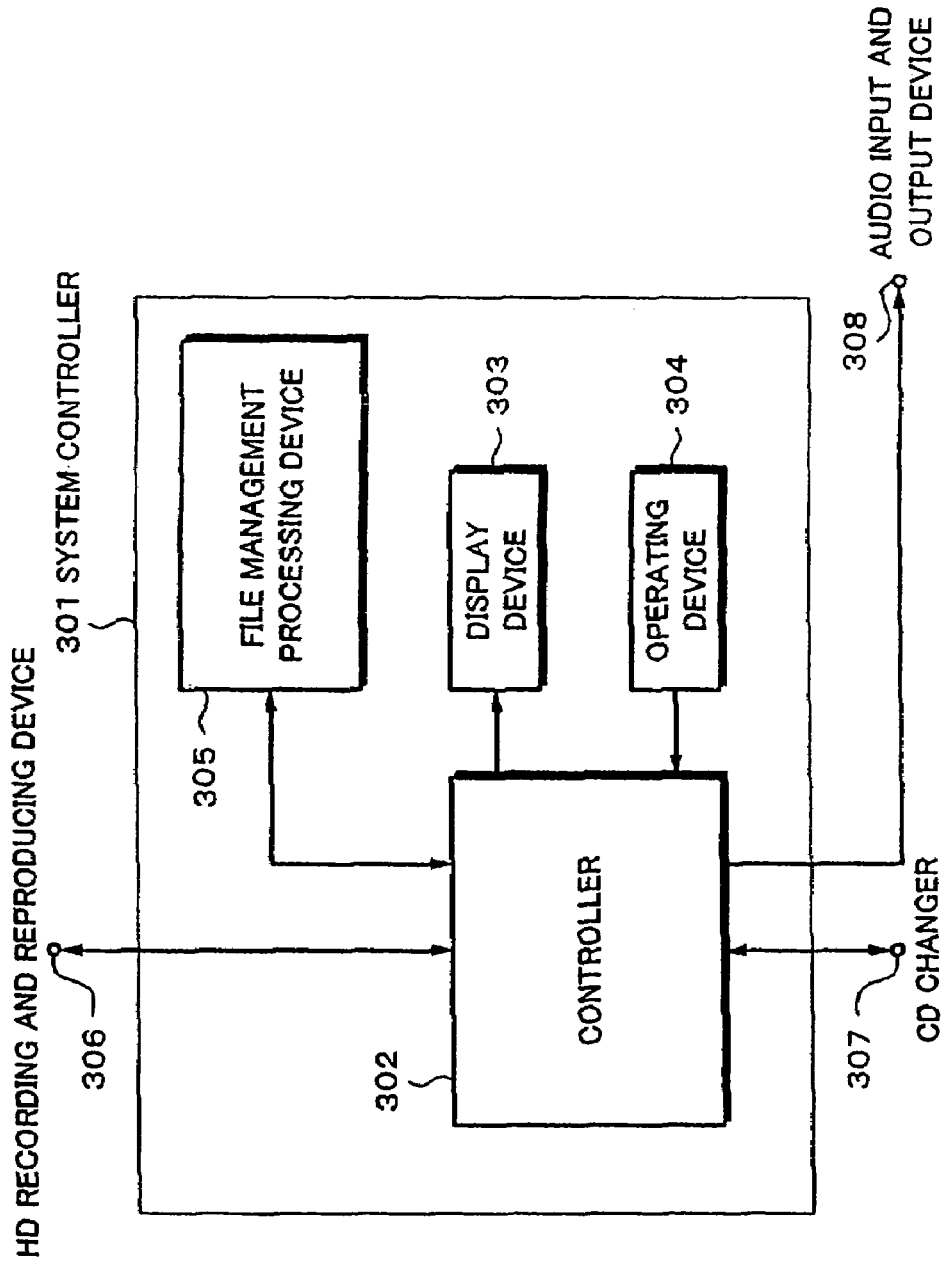
FIG. 14 is a block diagram showing an example of the structure of a system controller according to the embodiment of the present invention.

FIG. 14 is a block diagram showing the structure of the system controller 301. As shown in FIG. 14, the system controller 301 is composed of the controller 302, a display device 303, an operating device 304, and a file management processing device 305.

A control terminal 306 is connected to the control terminal 49 of the CD changer 1 through the cable 401. A control terminal 307 is connected to the control terminal 110 of the HD recording and reproducing device 101 through the cable 402. A control terminal 308 is connected to the control terminal 215 of the audio input and output device 201 through the cable 403.

The controller 302 has a microcomputer. The controller 302 controls the CD changer 1, the HD recording and reproducing device 101, and the audio input and output device 201. In reality, the controller 302 controls the CD changer 1, the HD recording and reproducing device 101, and the audio input and output device 201 corresponding to a signal supplied from the operating device 304 to the controller 302. In addition, the controller 302 controls the HD recording and reproducing device 101 corresponding to a signal supplied from the CD changer 1 to the system controller 301. In addition, the controller 302 controls the CD changer 1 corresponding to a signal supplied from the HD recording and reproducing device 101 to the system controller 301.

The controller 302 determines track record start time corresponding to TOC information supplied from the controller 47 of the CD changer 1. At the track record start time, the controller 302 orders the controller 105 to store an address pointer of audio data to the HDD 104. Alternatively, the controller 302 may determine track record start time corresponding to P channel supplied from the controller 47 of the CD changer 1.

In addition, the controller 302 determines track record end time corresponding to TOC information supplied from the controller 47 of the CD changer 1. AT track record end time, the controller 302 orders the controller 105 to store an address pointer of audio data to the HDD 104. Alternatively, the controller 302 may determine track record end time corresponding to P channel supplied from the controller 47 of the CD changer 1.

The display device 303 is a display device composed of for example a liquid crystal display or an FL tube. The display device 303 s connected to the controller 302. The display device 303 displays data corresponding to a signal supplied from the controller 302. For example, the display device 303 displays time information such as total play time of CDs 6 loaded in the CD changer 1, elapsed time of a music program which is being reproduced in the CD changer 1, remaining play time of a music program which is being reproduced in the CD changer 1, remaining play time of all CDs 6 loaded in the CD changer 1, a track number of a music program which is being reproduced in the CD changer 1, time information such as total play time of audio data recorded in the HD recording and reproducing device 101, elapsed time of a music program which is being reproduced in the HD recording and reproducing device 101, remaining play time of a music program which is being reproduced in the HD recording and reproducing device 101, total remaining play time of audio data recorded in the HD recording and reproducing device 101, a track number of a music program which is being reproduced in the HD recording and reproducing device 101, and so forth.

When information such as an album name and a track name has been recorded on a CD 6 or the HDD 104, the display device 303 may display these information. The display device 303 displays information corresponding to information supplied from the CD changer 1 to the system controller 301 or information supplied from the HD recording and reproducing device 101 to the system controller 301.

The operating device 304 has a power key, an eject key, a reproduction key, a pause key, a stop key, a music program selection key, a record key, a synchronous record key, a numeric key, a play list registration key, an end key, an enter key, a cancel key, a jog key, a menu key, and so forth. When these keys are pressed, signals corresponding thereto are supplied to the controller 302.

The synchronous record key is a key used to perform a synchronous recording. The synchronous recording is a recording method for automatically starting and stopping a recording operation in synchronization with the reproduction side. In reality, when the user presses the synchronous record key, the CD changer 1 starts a reproducing operation and the HD recording and reproducing device 101 also starts a recording operation. When the CD changer 1 stops the reproducing operation, the HD recording and reproducing device 101 stops the recording operation. Thus, without necessity of user's simultaneous operations for the CD changer 1 and the HD recording and reproducing device 101, music data reproduced by the CD changer 1 can be easily stored to the HD recording and reproducing device 101.

The play list registration key is used to register music programs to a play list. The menu key is used to cause the display device 303 to display a play list category selection screen.

The jog key of the operating device 304 is the same as the jog key 17 of the CD changer 1. The jog key of the operating device 304 has a push button disposed at center thereof.

The file management processing device 305 is connected to the controller 302. The file management processing device 305 is a device which controls a file management structure of the HDD 104. For example, the file management processing device 305 performs the following process.

The file management processing device 305 pre-creates folders in the HDD 104 corresponding to slots of the disc loading unit 3 through the controller 302 and the controller 105. When a dubbing operation is performed, individual albums are stored in folders which are automatically selected.

Besides the folders for albums, the file management processing device 305 pre-creates folders for play lists and stores play lists in the folders. In other words, play lists are managed in the same manner as albums. Play lists are managed as albums. Thus, the dubbing apparatus according to the embodiment of the present invention can manage albums and play lists totally, not separately.

In addition, according to the embodiment of the present invention, the file management processing device 305 creates 100 folders for albums and four folders for play lists.

In addition, the file management processing device 305 creates or updates a play list corresponding to a signal supplied from the operating device 304 through the controller 302. A play list is used to register music programs the user desires. In reality, the user selects his or her desired music programs from albums stored in the HD recording and reproducing device 101 and registers the selected music programs to a play list. Thus, corresponding to the created play list, user's desired music programs can be reproduced in the order of which they have been registered. The order of which the selected music programs are reproduced can be programmed. The selected music program can be reproduced at random (in a shuffled order). Real music data is not registered in a play list. Instead, titles of music programs or pointers which represent locations of music data is registered to a play list.

According to the embodiment of the present invention, three types of play lists are provided. The first type is a play list in which a predetermined number of music programs to which the user had most recently listened have been registered (hereinafter this type of play list is referred to as reproduction history play list). The second type is a play list in which a predetermined number of music programs to which the user had most frequently listened have been registered (hereinafter this type of play list is referred to as reproduction frequency play list). The third type is a play list in which music programs selected from all the virtual slots by the user have been registered (hereinafter this type of play list is referred to as selection play list). To select one of the three types of play lists, the user presses the menu key of the operating device 304 of the system controller 301 and selects a desired type on the menu displayed on the display device 303.

Whenever a CD 6 is changed to another one in the CD changer 1, the file management processing device 305 changes a folder for storing audio data to another one. Next, a folder changing process performed in the dubbing apparatus according to the embodiment of the present invention will be described.

When the dubbing apparatus according to the embodiment of the present invention changes CDs 6, it always performs a mechanical operation for loading and unloading them against a display reproducing unit (not shown). Thus, no sound state continues for a predetermined time period. Thus, by determining whether or not no sound state has continued for a predetermined time period, the dubbing device can determine whether or not CDs 6 have been changed.

Figure 15:
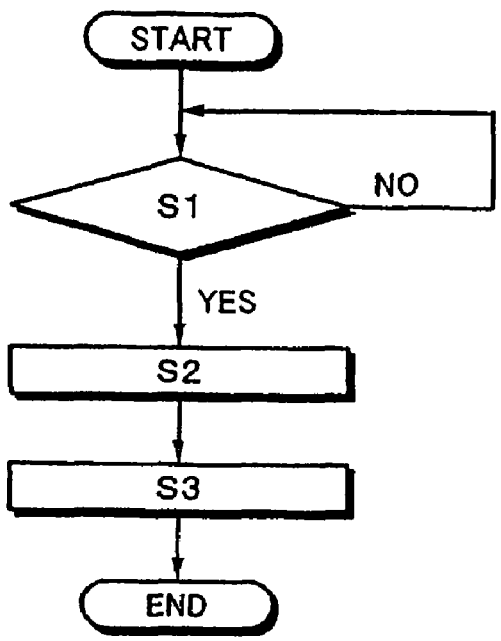
FIG. 15 is a flow chart for explaining an example of a folder changing process performed corresponding to a detected result of no sound state.

FIG. 15 is a flow chart for explaining an example of a folder changing process performed corresponding to a detected result of no sound state. First of all, the controller 47 of the CD changer 1 determines whether or not an output level of a signal which has been output from the EFM and CIRC decoding circuit 46 to the output terminal 48 is equal to or lower than a predetermined value (at step S1).

When the controller 47 has determined that the output level of the signal which had been output from the EFM and CIRC decoding circuit 46 to the output terminal 48 was equal to or lower than the predetermined value, the controller 47 supplies a control signal to the file management processing device 305 of the system controller 301 through the cable 401 (at step S2). When the file management processing device 305 has received the control signal, the file management processing device 305 changes a folder of the HDD 104 through the controller 302 and the controller 105 (at step S3).

According to the embodiment of the present invention, in the forgoing process, a folder is changed to another one. However, the present invention is not limited to the forgoing folder changing process. In other words, a folder can be changed to another one in the following process.

For example, depending on whether or not TOC information has been read, a folder can be changed to another one. Before the CD changer 1 reads music data from a CD 6, the CD changer 1 reads TOC information from the lead-in track of the CD 6. Thus, depending on whether or not TOC information had been read, it can be determined whether or not a CD 6 has been changed to another one. In reality, in the following process, a folder of the HD recording and reproducing device 101 is changed to another one.

Figure 16:
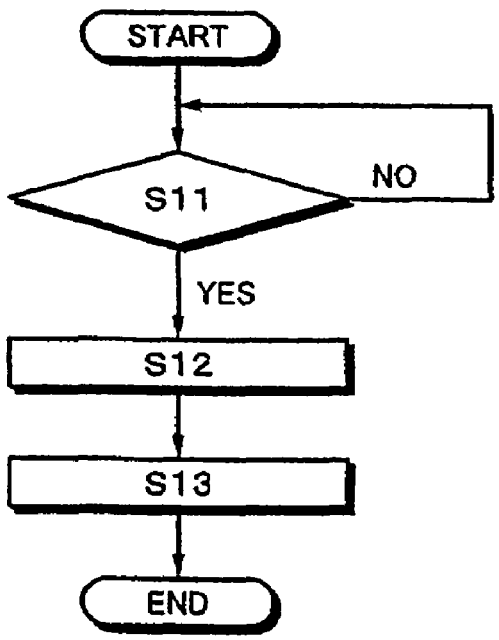
FIG. 16 is a flow chart for explaining an example of a folder changing process depending on whether or not TOC information has been read.

FIG. 16 is a flow chart for explaining an example of a folder changing process performed depending on whether or not TOC information has been read. First of all, the controller 47 of the CD changer 1 determines whether or not TOC information has been newly read corresponding to a signal supplied from the EFM and CIRC decoding circuit 46 (at step S11).

When the determined result represents that TOC information has been newly read, the controller 47 supplies a control signal to the file management processing device 305 of the system controller 301 through the cable 401 (at step S12). When the file management processing device 305 has received the control signal, the file management processing device 305 changes a folder of the HDD 104 to another one through the controller 302 and the controller 105 (at step S13).

Alternatively, a folder may be changed to another one depending on the total record time of TOC information which has been read from a CD 6. In reality, in the following process, a folder of the HD recording and reproducing device 101 is changed to another one.

Figure 17:
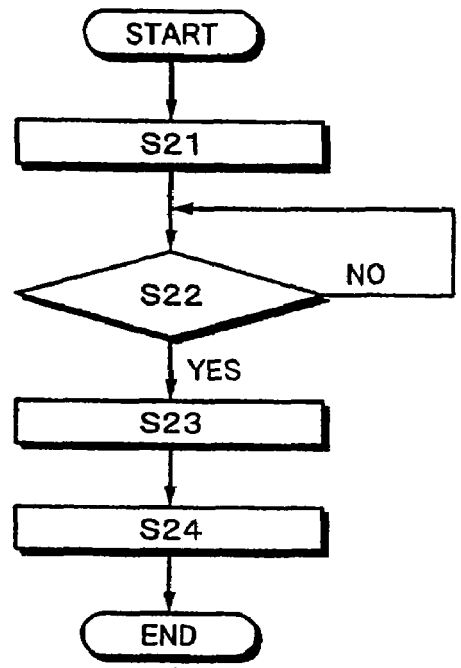
FIG. 17 is a flow chart for explaining an example of a folder changing process performed corresponding to total remaining record time of TOC information.

FIG. 17 is a flow chart for explaining an example of a folder changing process performed depending on total record time of TOC information or the like. First of all, the controller 302 receives TOC information which has been read from a CD 6 and records information such as the PMIN portion (absolute time minute component portion), the PSEC portion (absolute time second component portion), and so forth contained in the TOC information (at step S21).

Thereafter, the controller 302 determines whether or not recorded time has elapsed (at step S22). When the determined result represents that the recorded time has elapsed, the controller 302 transmits a control signal to the file management processing device 305 (at step S23). When the file management processing device 305 has received the control signal, the file management processing device 305 changes a folder of the HDD 104 to another one corresponding to the controller 302 and the controller 105 (at step S24).

Alternatively, the CD changer 1 and the HD recording and reproducing device 101 may be sequentially controlled so that the system controller 301 changes a CD 6 of the CD changer 1 to another one and a folder of the HD recording and reproducing device 101 to another one. In reality, the system controller 301 changes a folder of the HD recording and reproducing device 101 to another one in the following process.

Figure 18:
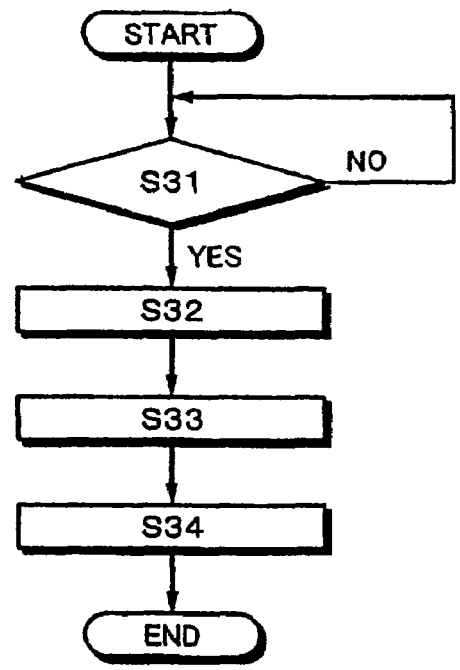
FIG. 18 is a flow chart for explaining an example of a folder changing process performed corresponding to a sequential control of a system controller.

FIG. 18 is a flow chart for explaining an example of a folder changing process performed under a sequential control of the system controller 301. First of all, the controller 302 determines whether or not music data has been reproduced from a CD 6 corresponding to a signal supplied from the CD changer 1 to the system controller 301 (at step S31).

When the determined result represents that audio data has been reproduced from the CD 6, the controller 302 transmits a control signal to the file management processing device 305 (at step S32) and changes the CD 6 of the CD changer 1 to another one (at step S33). The file management processing device 305, which has received the control signal, changes a folder of the HDD 104 to another one through the controller 302 and the controller 105 (at step S34).

As was described above, an album is sequentially dubbed from the CD changer 1 to the HD recording and reproducing device 101. Thus, it seems to the user that the album is automatically dubbed from the CD changer 1 to the HD recording and reproducing device 101.

Figure 19:
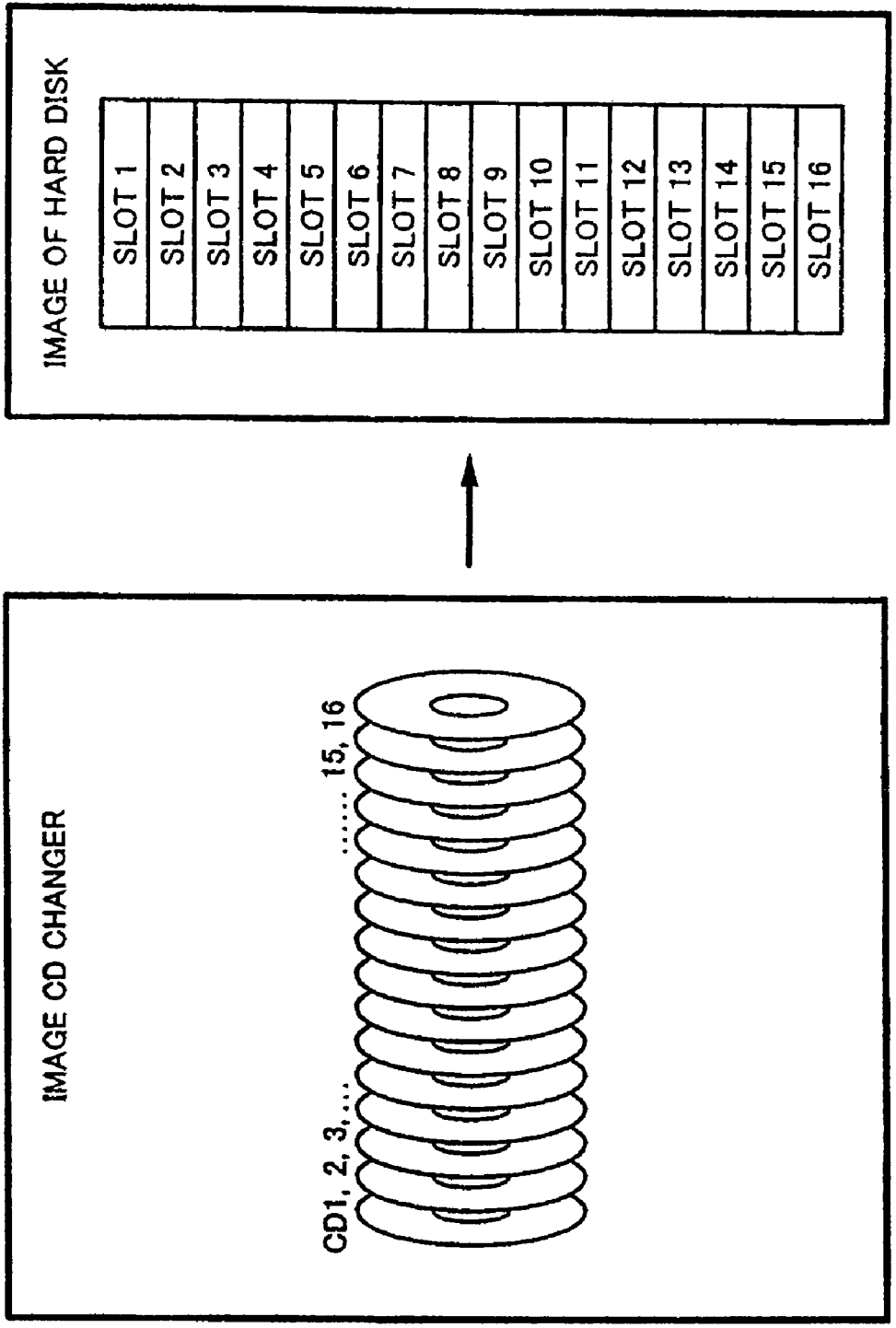
FIG. 19 is a schematic diagram showing an image of a file management structure according to the embodiment of the present invention.

FIG. 19 is a schematic diagram showing an image for explaining a file management structure of the dubbing apparatus according to the embodiment of the present invention. FIG. 19 shows an example of which music data of 16 albums loaded in the CD changer 1 is stored in 16 folders of the HD recording and reproducing device 101.

FIG. 19A is a schematic diagram showing an image of CDs 6 loaded in the disc loading unit 3 of the CD changer 1. As shown in FIG. 19A, 16 albums are loaded in slots 1 to 16 of the CD changer 1.

FIG. 19B is a schematic diagram showing an image of a file management structure of the HD recording and reproducing device 101 corresponding to the albums loaded in the CD changer 1 shown in FIG. 19A. The dubbing apparatus according to the embodiment of the present invention allows the user to have virtual boxes (namely, virtual slots) corresponding to CDs 6 stored in the HDD 104. In other words, the dubbing apparatus according to the embodiment of the present invention has a file management structure as if the disc loading unit 3 were in the HDD 104.

Thus, after audio data of CDs 6 loaded in the CD changer 1 is stored to the HD recording and reproducing device 101, it seems to the user that the CDs 6 were loaded in the CD changer 1. Thus, the user can operate the HD recording and reproducing device 101 as if he or she operated the CD changer 1.

Next, as a more practical example of the file management structure, the case that 104 folders from folder 100 to folder 104 have been created in the HDD 104 by the file management processing device 305 will be described. In the example, 100 folders from folder 1 to folder 100 are folders for albums. Four folders from folder 101 to folder 104 are folder for play lists.

Figure 20:
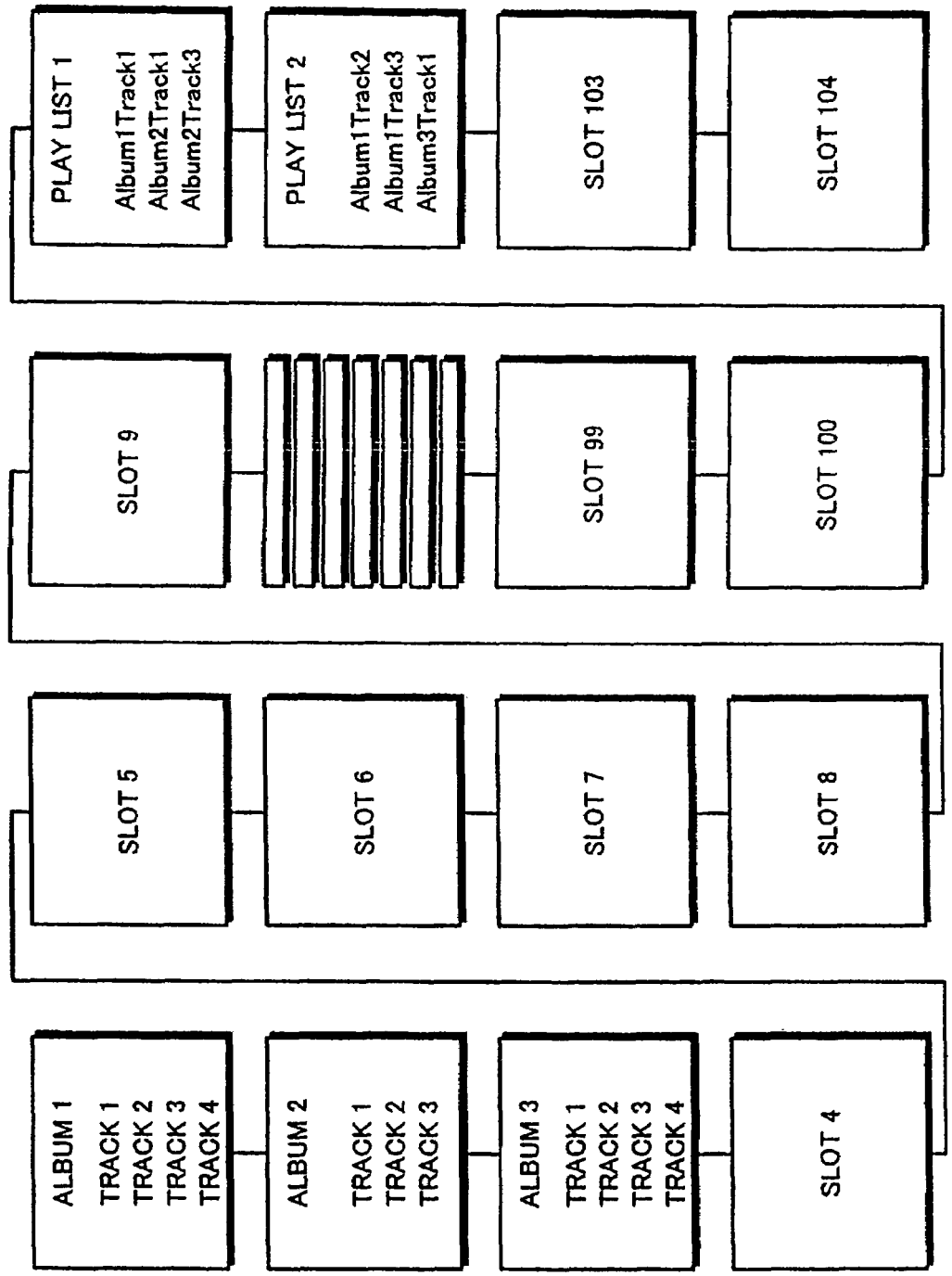
FIG. 20 is a schematic diagram showing an example of a file management structure according to the embodiment of the present invention.

FIG. 20 more practically shows an image of a file management structure. As shown in FIG. 20, the user can imagine 104 virtual slots in the HDD 104. In reality, the user can imagine virtual slots from slot 101 to slot 104 for four play lists.

In FIG. 20, albums 1, 2, and 3 have been stored in virtual slots 1, 2, and 3, respectively. Albums 1, 2, and 3 have four tracks, three tracks, and four tracks, respectively.

Play lists 1 and 2 have been registered to virtual slots 101 and 102, respectively. Track 1 of album 1 stored in virtual slot 1 and tracks 1 and 3 of album 3 stored in virtual slot 2 have been registered to play list 1. On the other hand, tracks 2 and 3 of album 1 stored in virtual slot 1 and track 1 of album 3 stored in virtual slot 3 have been registered to play list 2.

FIG. 21 shows an example of the structure of a database according to the embodiment of the present invention. Data managed with the database is categorized as all album data, each album data, each track data, and reproduction frequency data. Next, an example of the database containing the four types of data in the file management structure shown in FIG. 20 will be described.

FIG. 21A shows the structure of the all album data. The all album data is data with respect to all albums stored in the HD recording and reproducing device 101. Total capacity represents a capacity of data which can be stored in the HDD 104. The total capacity is for example 20 GB, 40 GB, etc. According to the embodiment of the present invention, the total capacity is 40 GB.

Number of folders represents the number of folders created in the HD recording and reproducing device 101. The number of folders includes the number of folders for albums and the number of folders for play lists. This is because the dubbing apparatus according to the embodiment of the present invention manages play lists in the same manner as albums and treats play lists as albums. Thus, according to the embodiment of the present invention, the number of folders is 104.

Play list start number represents a folder from which a play list folder starts. Folders from a folder with the play list start number to a folder with the last number are used as folders for play lists. According to the embodiment of the present invention, the play list start number is 101. In other words, folders 101 to 104 are used as folders for play lists.

According to the embodiment of the present invention, an example of which a folder with the play list start number to a folder with the last number are assigned as folders for play lists is described. However, according to the present invention, folders for play lists are not limited to those. For example, a folder with the folder start number (folder 1) to a folder with a predetermined folder number may be assigned as folders for play lists. Alternatively, a predetermined number of folders in the middle of all folders may be assigned as folders for play lists. Alternatively, folders selected at random not successive folders may be assigned as folders for play lists. When folders which have been selected at random are assigned as folders for play lists, it is necessary to identify them so that they are folders for play lists. In reality, all album data contains folder numbers for play lists instead of the forgoing play list start number.

All folder total use time represents time information with respect to total reproduction time of audio data stored in all folders (from folder 1 to folder 100). For example, the all folder total use time is represented with for example day, hour, minute, second, frame, and so forth.

All recordable time represents information with respect to recordable time (namely, time information for which audio data can be further stored in the HD recording and reproducing device 101. For example, the all recordable time represents time information with % (percent) (free capacity of the HDD 104), day, hour, minute, second, frame, and so forth.

All folder blank information represents whether or not each folder has a free space. In reality, the all folder blank information represents whether or not each folder has a free space with one bit of information. In other words, when a folder has a free space, 0 is set to the corresponding bit. In contrast, when a folder does not have a free space, 1 is set to the corresponding bit. According to the embodiment of the present invention, the all folder blank information is composed of 104 bits. 1 is set to bits for the folders 1, 2, 3, 101, and 102. 0 is set to other bits.

Album pointer is a pointer which represents a location of the HD of the HDD 104 at which each album data has been assigned. According to the embodiment of the present invention, since 104 folders have been provided, album pointer is composed of album 1 pointer, album 2 pointer, . . . , and album 104 pointer.

FIG. 21B shows the structure of each album data. Each album data is data with respect to one album stored in each folder.

Folder number represents a number assigned to each folder. According to the embodiment of the present invention, the folder number ranges from 1 to 104. The folder number is followed by data with respect to a folder corresponding to the folder number and an album stored in the folder.

Start track number represents a number with which track number the album starts. Normally, 1 is set to the start track number.

Last track number represents a number with which track the album ends. The number of tracks of the album stored in the folder is obtained by subtracting the start track number from the last track number and adding 1 to the subtracted result. However, when the last track number and the start track number are 0, the number of tracks is 0.

Total time represents total reproduction time for which all audio data of the album is reproduced. The total time is represented with for example day, hour, minute, second, frame, and so forth.

Recorded date and time represents time information with respect to the date and time on and at which the album or a name which will be described later has been stored. The recorded date and time represents time information with for example year, month, day, hour, minute, second, and so forth.

Name represents a name assigned to the folder. Artist represents a name of an artist assigned to the folder. For example, the name the artist are registered by the user. In reality, before audio data is stored from the CD changer 1 to the HD recording and reproducing device 101, while audio data is being stored, or after audio data has been stored, the name and the artist are registered with the operating device 304 of the system controller 301.

Highlight track is a representative track of all tracks of the album. When audio data of the highlight track of the album is reproduced, the user can easily search for his or her desired album.

Track pointer is a pointer which represents a location of the file system 106 at which each track data of the album has been assigned. The track pointer is composed of track 1 pointer, track 2 pointer, . . . and so forth.

FIG. 21C shows the structure of each track data. Each track data is data with respect to each track of an album stored in each folder.

Belonging folder number represents a folder number of a folder to which the track belongs. According to the embodiment of the present invention, the folder number ranges from 1 to 100.

Track number represents a track number of the track in the album stored in the folder.

Total time represents total reproduction time of audio data of the track. The total time is time information represented with for example day, hour, minute, second, frame, and so forth.

Recorded date and time represents a date and time on and at which audio data of the track has been stored from the CD changer 1 to the HD recording and reproducing device 101. The recorded date and time is represented with for example year, month, day, hour, minute, second, and so forth.

Name represents a name assigned to the track. Artist represents an artist name assigned to the track. For example, the name and the artist are registered by the user. In reality, before audio data is stored from the CD changer 1 to the HD recording and reproducing device 101, while audio data is being stored, or after audio data has been stored, the name and the artist are registered with the operating device 304 of the system controller 301.

Accessed date and time represents a date and time on and at which the track has been accessed most recently. The accessed date and time represents date and time information with for example year, month, day, hour, minute, second, and so forth. With the information, the user can easily search music programs to which he or she has often listened recently. The accessed date and time is used when the forgoing reproduction history play list is created.

Highlight point represents position information of a highlight portion. In reality, the highlight point is composed of a start point and an end point. When a content is a music source, a highlight is for example a beginning part, a middle part, an end part, and a climax part of a music program which features the entire music program. In addition, a climax scene part is equivalent to a highlight. A highlight is a synonym of digest, climax, and most impressed part. Thus, when a representative part of each track stored in the folder is reproduced, the user can easily search a plurality of tracks for his or her desired music program with the highlight point.

ISRC (International-Standard-Recording-Code) data represents an internationally standardized identification code assigned to music software (program). The ISRC is a unique code assigned to each music program recorded on an optical disc.

FIG. 21D shows the structure of reproduction frequency data.

Reproduction frequency data is data which represents the reproduction frequency of each track of each album stored in the HD recording and reproducing device 101. In other words, reproduction frequency data is data which represents the number of reproduction times of each track. According to the embodiment of the present invention, reproduction frequency data is composed of belonging folder number, track number, and number of reproduction times. In this example, reproduction frequency data of music data of each track is sorted and stored in the order of which music data has been most often reproduced. Thus, the user can easily recognize reproduction frequency of music data of each track. Reproduction frequency data is used when the forgoing reproduction frequency play list is created and managed.

Belonging folder number represents a folder number of a folder to which a track belongs. Track number represents a track number of a track in an album stored in a folder. Number of reproduction times represents the number of times of which music data of a track has been reproduced.

FIG. 22 is a schematic diagram for explaining a highlight of an album and a highlight of each track of an album. In this example, each track of album 1 stored in folder 1 (virtual slot 1) of the HD recording and reproducing device 101 and each track of album 2 stored in folder 2 (virtual slot 2) are shown. A highlight of an album is a highlight of a highlight track (representative music program) of an album.

Figure 22A:
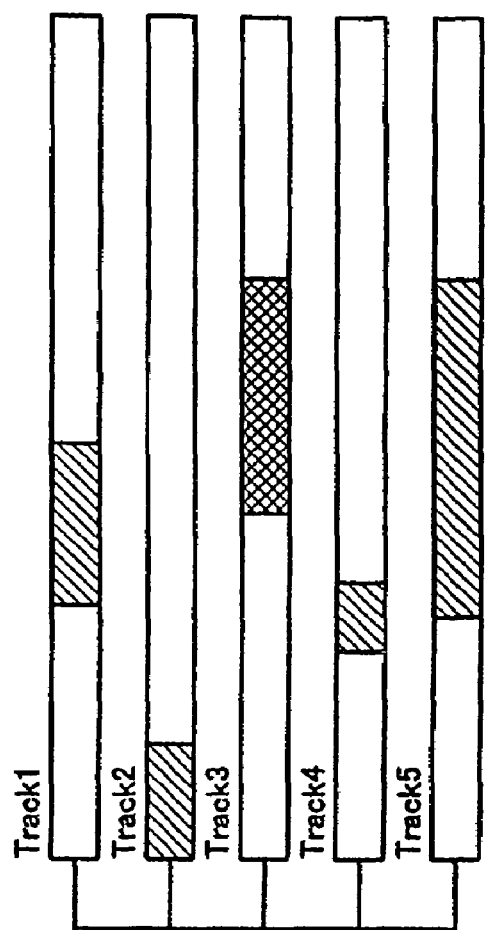
FIG. 22 is a schematic diagram showing a highlight of each album and a highlight of each track of each album stored in the HD recording and reproducing device according to the embodiment of the present invention.

FIG. 22A shows highlights of tracks of album 1. As shown in FIG. 22A, album 1 is composed of tracks 1, 2, 3, 4, and 5. Highlights of the tracks have been set at hatched positions shown in FIG. 22A. A highlight track of album 1 is track 3. Thus, a highlight of album 1 is a highlight of track 3.

Figure 22B:
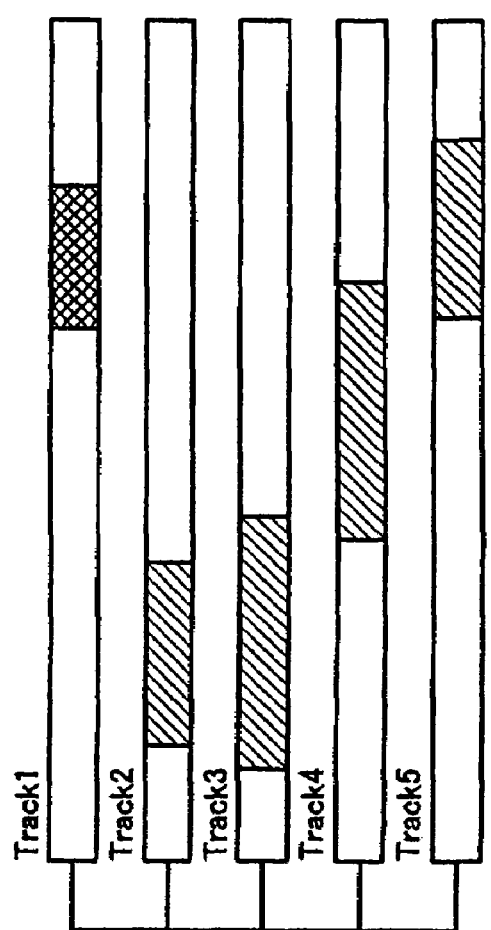

FIG. 22B shows highlights of tracks of album 2. As shown in FIG. 22B, album 2 is composed of tracks 1, 2, 3, 4, and 5. Highlights of the tracks have been set at hatched positions shown in FIG. 22B. A highlight track of album 2 is track 1. Thus, a highlight of album 2 is a highlight of track 3.

The dubbing apparatus according to the embodiment of the present invention can perform an album highlight scan reproduction and a track highlight scan reproduction. In the album highlight scan reproduction, the dubbing apparatus successively reproduces highlights of tracks of albums in the order of folder numbers (in the order of virtual slot numbers). In the track highlight scan reproduction, the dubbing apparatus reproduces highlights of tracks of albums in the order of track numbers of each album.

The dubbing apparatus according to the embodiment of the present invention has three highlight registration modes. In the first registration mode, the dubbing apparatus registers a highlight with a single key operation (hereinafter this mode is referred to as registration mode 1). In the second registration mode, the dubbing apparatus allows the user to confirm a highlight to be registered in advance (hereinafter this mode is referred to as registration mode 2). In the third registration mode, the dubbing apparatus allows the user to confirm a highlight to be registered in advance and finely adjust it (hereinafter this mode is referred to as registration mode 3). These registration mode may be switched with the operating device 304 of the system controller 301. Next, with reference to flow charts, highlight registering operations and their processes corresponding to these registration modes will be described. In the following description, an example of which a highlight of track 3 of album 1 stored in folder 1 (virtual slot 1) of the HD recording and reproducing device 101 is registered will be described.

Figure 23:
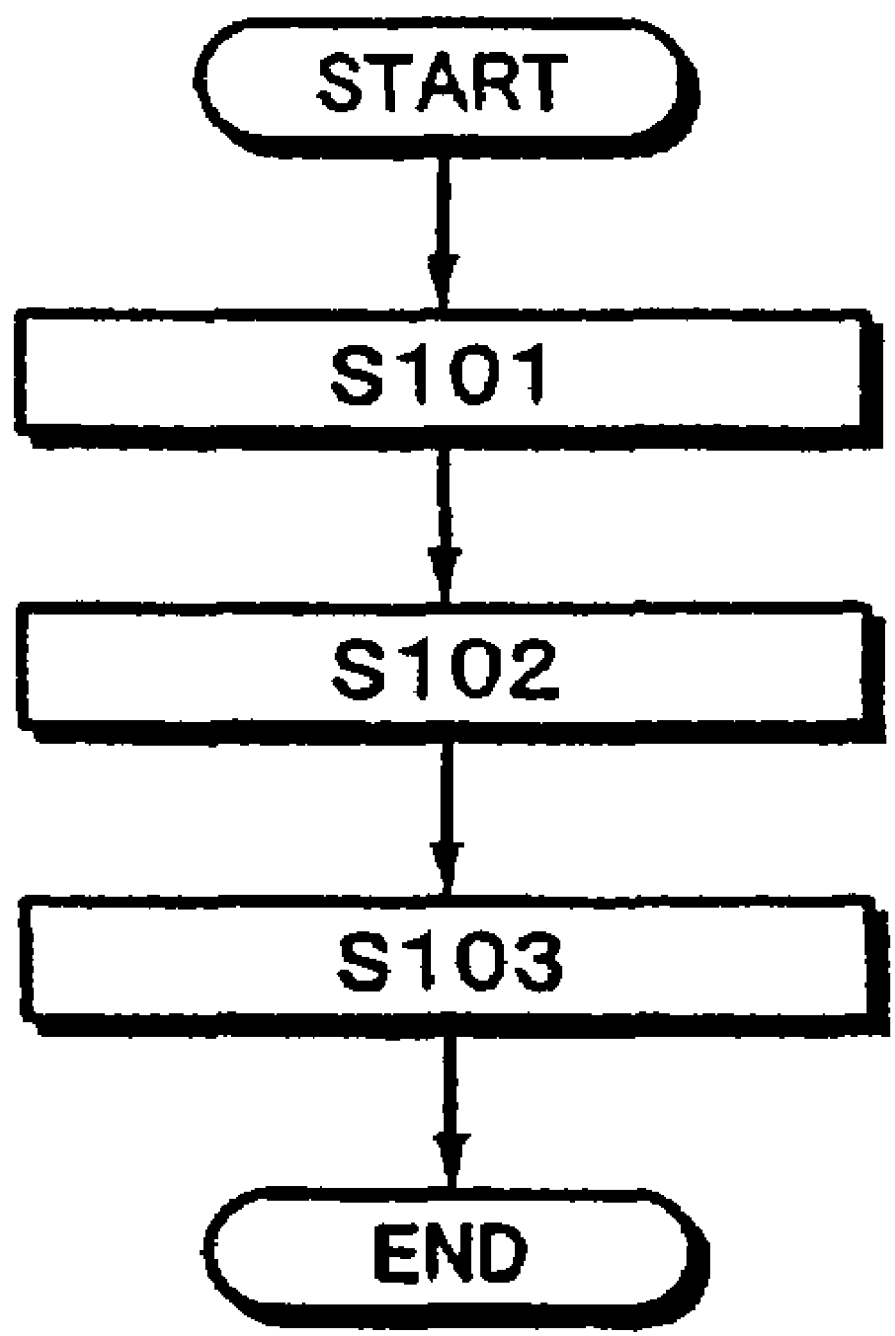
FIG. 23 is a flow chart for explaining a highlight registering operation in mode 1 of the dubbing apparatus according to the embodiment of the present invention.

FIG. 23 is a flow chart for explaining a highlight registering operation and its process corresponding to the registration mode 1. First of all, track 3 of album 1 is reproduced so as to register a highlight of track 3 (at step S101).

While a portion to be registered as a highlight of track 3 is being reproduced, the user presses a highlight key of the operating device 303 of the system controller 301 (at step S102). As a result, information of the database shown in FIG. 21 is rewritten. In other words, track 3 is recorded to the highlight track of the album data of folder number 1 shown in FIG. 21B. In addition, a highlight point of the highlight designated at step S102 (namely, a start point and an end point of the highlight designated at step S102) is recorded to a highlight point of track data of belonging slot number 1 and track number 3 (at step S103). In this example, position information of data which was being reproduced when the highlight key was pressed becomes a start point. Position information of data which was being reproduced 10 seconds after the highlight key was pressed becomes an end point. In other words, the duration of a music program registered as a highlight is 10 seconds.

In the forgoing example, position information of data which was being reproduced 10 seconds after the highlight key was pressed becomes an end point. Alternatively, the user can freely set the duration of a music program registered as a highlight.

Figure 24:
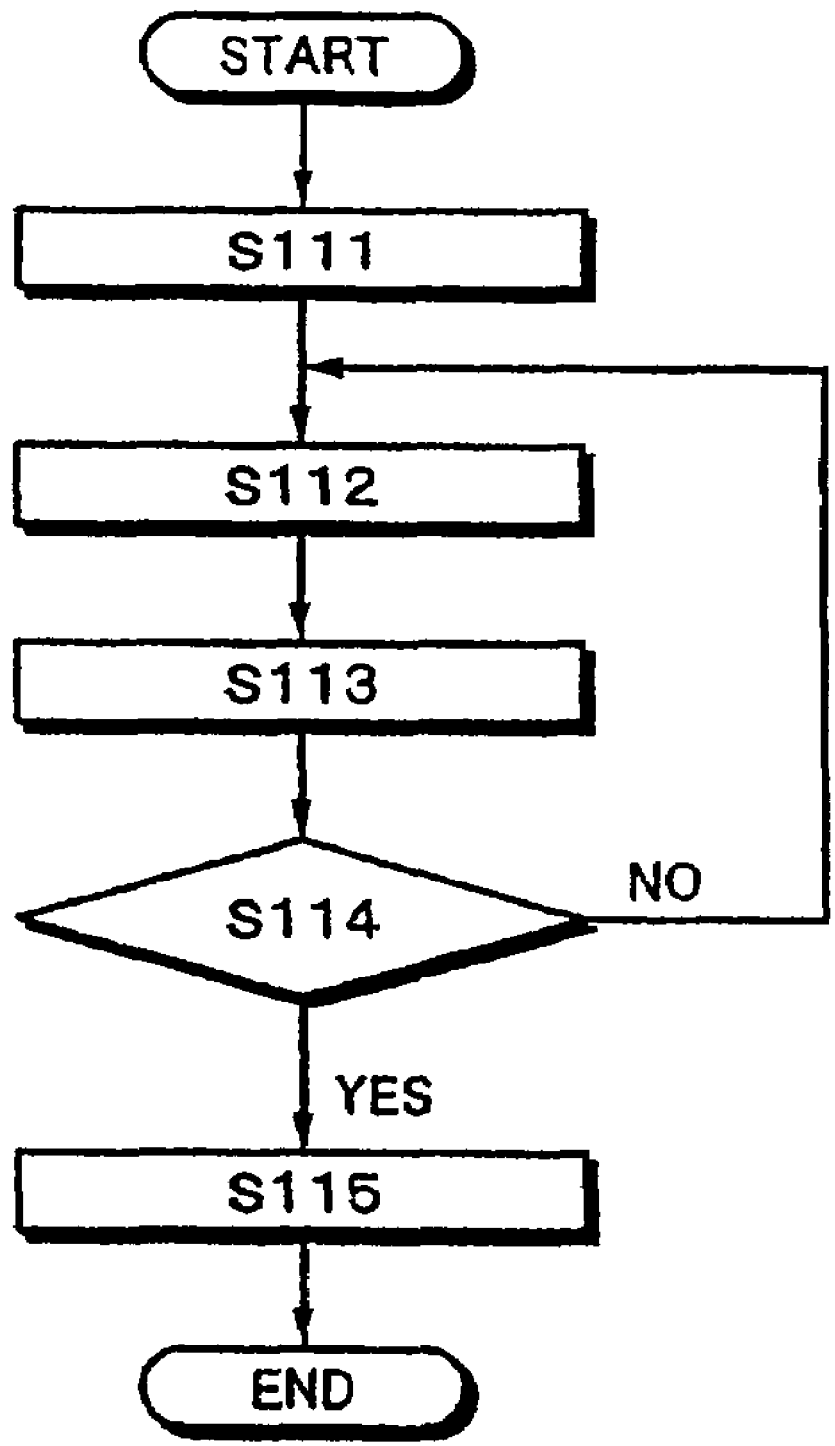
FIG. 24 is a flow chart for explaining a highlight registering operation in mode 2 of the dubbing apparatus according to the embodiment of the present invention.

FIG. 24 is a flow chart for explaining a highlight registering operation and a highlight registering process corresponding to the registration mode 2. First of all, track 3 of album 1 is reproduced so as to register a highlight of track 3 (at step S111).

While a portion to be registered as the highlight of track 3 is being reproduced, the user presses the highlight key of the operating device 303 of the system controller 301 (at step S112). Thus, a signal corresponding to the operation of the highlight key is transmitted from the operating device 303 to the controller 302. When the controller 302 has received the signal, the controller 302 transmits a signal which represents that the highlight key has been pressed to the controller 105 of the HD recording and reproducing device 101. At step S112, the controller 105 which has received the signal stores a highlight point of the designated highlight (namely, a start point and an end point of the highlight) to the storing device of the controller 105. In this example, position information of data which was being reproduced when the highlight key was pressed becomes a start point. In addition, position information of data which was being reproduced 10 seconds after the highlight key was pressed becomes an end point. In other words, the duration of a music program registered as a highlight is 10 seconds.

Thereafter, corresponding to the start point and the end point of the highlight, which have been stored in the storing device of the controller 105, the controller 105 reads audio data from the HDD 104. As a result, the highlight which has been set at step S102 is repeatedly reproduced (hereinafter this operation is referred to as rehearsal reproduction) (at step S113).

Thereafter, the user determines whether or not the highlight which has been rehearsal reproduced at step S113 is a highlight which he or she wants to register (at se S114). When the highlight reproduced as the rehearsal reproduction is user's desired highlight, he or she presses the enter key. As a result, information of the database shown in FIG. 21 is rewritten. In other words, track 3 is recorded to the highlight track of the album data of folder number 1 shown in FIG. 21B. In addition, the highlight point of the highlight designated at step S112 (namely, the start point and the end point of the highlight, which have been designated at step S12) are recorded to the highlight point of the track data of track number 3 (at step S115).

When the highlight reproduced at step S113 is not user's desired highlight, he or she presses the cancel key. As a result, music data of track 3 of album 1 is reproduced from the beginning.

Alternatively, when the user presses the end key or the cancel key, the highlight registering operation may be cancelled in the middle. In the forgoing example, when the highlight reproduced at step S113 is not user's desired highlight, he or she presses the cancel key. As a result, music data of the track is reproduced from the beginning. Alternatively, music data may be reproduced from a portion several seconds before the start point which has been set at step S112.

In the forgoing example, position information of data which was being reproduced 10 seconds after the highlight key was pressed becomes the end point. Alternatively, the user can freely set the duration of a music program registered as a highlight.

In the forgoing example, the start point and the end point are stored in the storing device of the controller 105 of the HD recording and reproducing device 101. Alternatively, audio data designated with these points may be stored in the storing device. In other words, the rehearsal reproduction may be performed by reading audio data from the storing device of the controller 105.

As was described above, before a highlight is registered, the dubbing apparatus according to the embodiment of the present invention can perform the rehearsal reproduction. Thus, the user can check whether or not his or her desired portion has been set as a highlight. When user's desired portion has not been set as a highlight, he or she can reproduce the same track and register a highlight. Thus, the user can easily set a highlight again.

Figure 25:
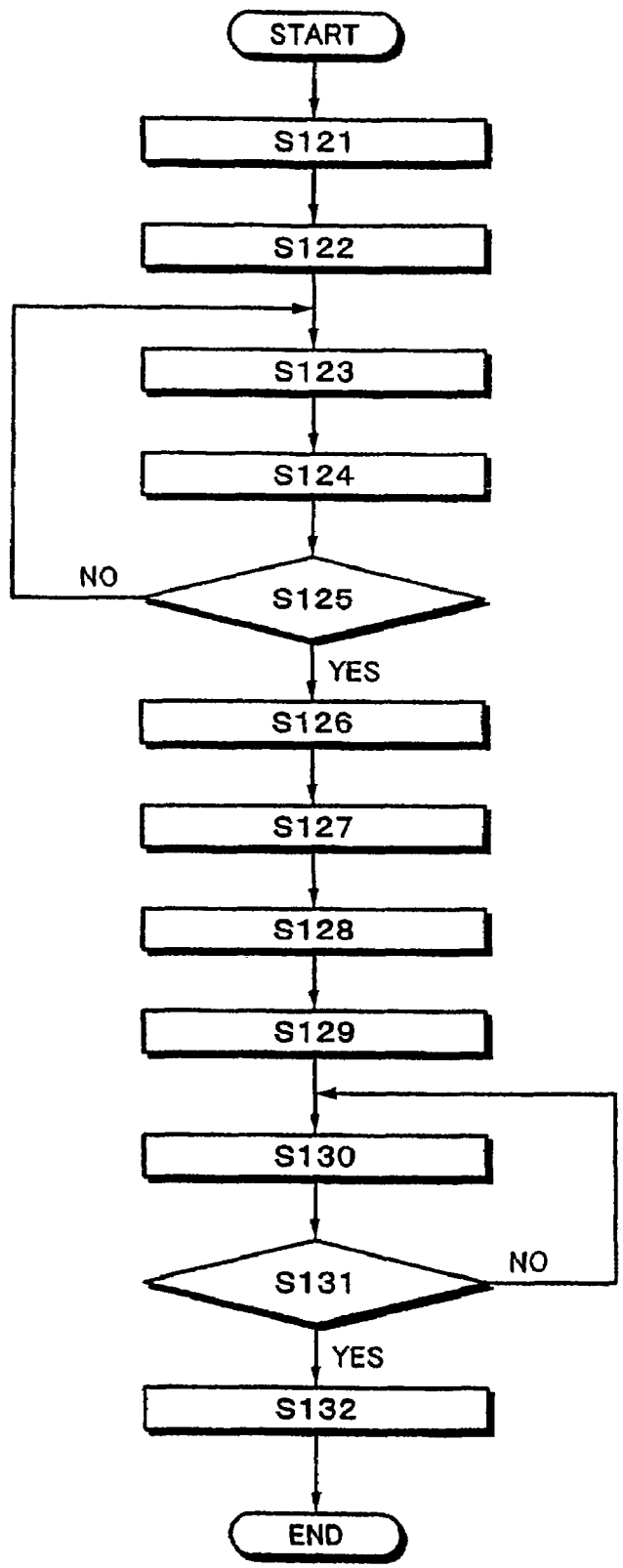
FIG. 25 is a flow chart for explaining a highlight registering operation in mode 3 of the dubbing apparatus according to the embodiment of the present invention.

FIG. 25 is a flow chart for explaining a highlight registering operation and a highlight registering process corresponding to the registration mode 3. First of all, track 3 of album 1 is reproduced so as to register a highlight of track 3 (at step S121).

While a beginning portion to be registered as a highlight of track 3 is being reproduced, the user presses the highlight key or the push button of the jog key of the operating device 303 of the system controller 301 (at step S122). As a result, a signal corresponding to the operation of the highlight key or the push button switch of the jog key is transmitted from the operating device 303 to the controller 302. The controller 302, which has received the signal, transmits a signal which informs the HD recording and reproducing device 101 that the highlight key or the push button switch of the jog key has been pressed to the controller 302. When the controller 302 has received the signal, the controller 302 transmits the signal to the controller 105 of the HD recording and reproducing device 101. The controller 105 which has received the signal stores a start point of the highlight designated at step S122 to the storing device of the controller 105. In this example, data which was being reproduced when the highlight key or the push button switch of the jog key was pressed becomes the start point.

Figure 26A:
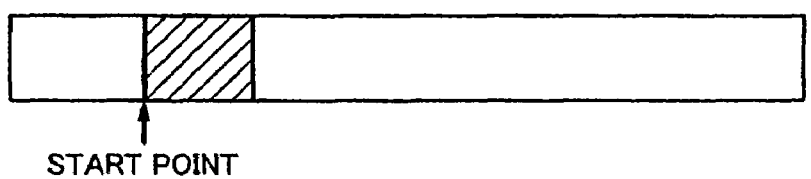
FIG. 26 is a schematic diagram for explaining a highlight registering operation in mode 3 of the dubbing apparatus according to the embodiment of the present invention.

At step S103, audio data designated with the start point stored in the storing device of the controller 302 and a point several seconds later therefrom (namely, a hatched portion of a track shown in FIG. 26A) is rehearsal reproduced (at step S123). According to the embodiment of the present invention, audio data designated with the start point stored in the storing device and a point five seconds later thereafter is rehearsal reproduced.

Thereafter, with an FF key and an FR key, the user positions the cursor at his or her desired portion of hour, minute, second, and frame displayed on the display device 303. Thereafter, by turning the jog key, the user sets his or her desired value (at step S124).

Thereafter, the user listens to audio data which is being rehearsal reproduced and checks whether or not the start point of the highlight has been set at his or her desired position (at step S125). When the start point has not been set at his or her desired position, he or she presses the cancel key. As a result, the flow returns to step S123. At step S123, audio data designated with the start point stored in the storing device of the controller 302 and a point several seconds later therefrom (namely, the hatched portion of the track shown in FIG. 26A) is rehearsal reproduced.

When the start point has been set at his or her desired position, he or she presses the enter key. As a result, audio data is reproduced from point A (at step s126). In addition, a prompt "End point?" which asks the user to designate an end portion of the highlight is displayed on the display device 303 of the system controller 201 (at step S127).

When the end portion to be registered as the highlight has been reproduced, the user presses the highlight key or the push button key of the jog key of the operating device 303 (at step S128). As a result, a signal corresponding to the operation of the highlight key or the push button key of the jog key is transmitted from the operating device 303 to the controller 302. When the controller 302 has received the signal, the controller 302 transmits a signal which informs the HD recording and reproducing device 101 that the highlight key or the push button key of the jog key has been pressed to the controller 105 of the HD recording and reproducing device 101. The controller 105, which has received the signal, stores the end point of the highlight, which has been designated at step S128, to the storing device of the controller 105. In this example, position information of data which was being reproduced when the highlight key or the push button key of the jog key was pressed becomes an end point.

Figure 26B:
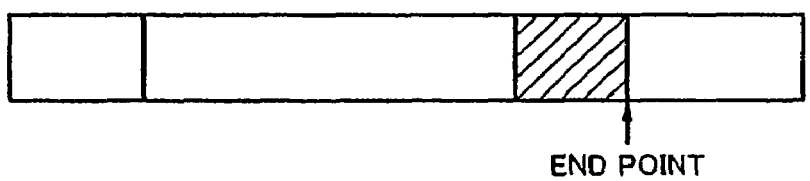

Thereafter, audio data designated with the start point stored in the storing device of the controller 105 and a point several seconds earlier therefrom (namely, a hatched portion of a track shown in FIG. 26B) is rehearsal reproduced (at step S129). According to the embodiment of the present invention, audio data designated with the start point stored in the storing device and a point five seconds later therefrom is rehearsal reproduced.

Thereafter, with the FF key and the FR key, the user positions the cursor at his or her desired portion of hour, minute, second, and frame displayed on the display device 303. Thereafter, by turning the jog key, the user sets his or her desired value (at step S130).

Thereafter, the user listens to audio data which is being rehearsal reproduced and checks whether or not the end point of the highlight has been set at his or her desired position (at step S131). When the end point of the highlight has been set at his or her desired position, the user presses the cancel key. As a result, the flow returns to step S130. At step S130, audio data designated with the start point stored in the storing device of the controller 105 and a point several seconds earlier therefrom (namely, the hatched portion of the track shown in FIG. 26B) is rehearsal reproduced.

Figure 26C:
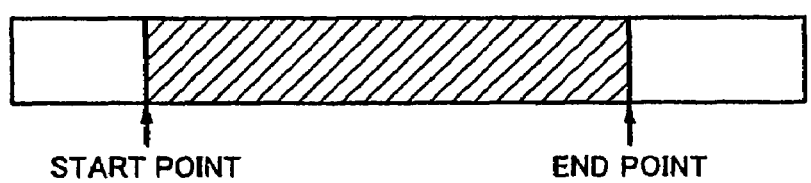

When the end point of the highlight has been set at the desired position, the user presses the enter key. As a result, information of the database shown in FIG. 21 is rewritten. In other words, track 3 is recorded to the highlight track of the slot of slot number 1. In addition, the highlight point which has been finely adjusted at steps S124 and S130 (namely, an end point and a start point shown in FIG. 26C) is recorded to the highlight point of the track data of belonging slot number 3 (at step S132).

In the forgoing example, the start point is stored in the storing device of the controller 105. Alternatively, audio data designated with the start point and a point several seconds later therefrom may be stored in the storing device. In other words, the rehearsal reproduction may be performed by reading audio data from the storing device of the controller 105.

In the forgoing example, the end point is stored in the storing device of the controller 105. Alternatively, audio data designated with the end point and a point several seconds earlier therefrom may be stored in the storing device. In other words, the rehearsal reproduction may be performed by reading audio data from the storing device of the controller 105.

As was described above, the dubbing apparatus according to the embodiment of the present invention allows the user to finely correct both a start point and an end point of a highlight to be registered. In addition, besides the start point, the user can freely set the end point. Thus, the user can freely set the duration of a highlight.

In the dubbing apparatus according to the embodiment of the present invention, with the forgoing three registration modes, when a highlight of a track is registered, the registered track is automatically assigned as a highlight track of the album. In other words, whenever a highlight of a track is registered, a highlight track of the album is automatically updated.

In the dubbing apparatus according to the embodiment of the present invention, with highlights registered in the forgoing manner, the user can search for his or her desired album or track. In addition, the dubbing apparatus according to the embodiment of the present invention has three searching modes: a first searching mode for searching a plurality of albums for a desired album—this mode is referred to as album searching mode, a second searching mode for searching a selected album (current album) for a desired track—this mode is referred to as track searching mode, and a third searching mode for searching a plurality of albums for a desired track—this mode is referred to as album & track searching mode. The album & track searching mode is a combination of the album searching mode and the track searching mode.

FIG. 27 is a schematic diagram showing an image of a searching process corresponding to the album & track searching mode of the dubbing apparatus according to the embodiment of the present invention. FIG. 27 shows the case that a track which the user desires is a track of album 3 stored in folder 3 (virtual slot 3).

Figures 27A, 27B:
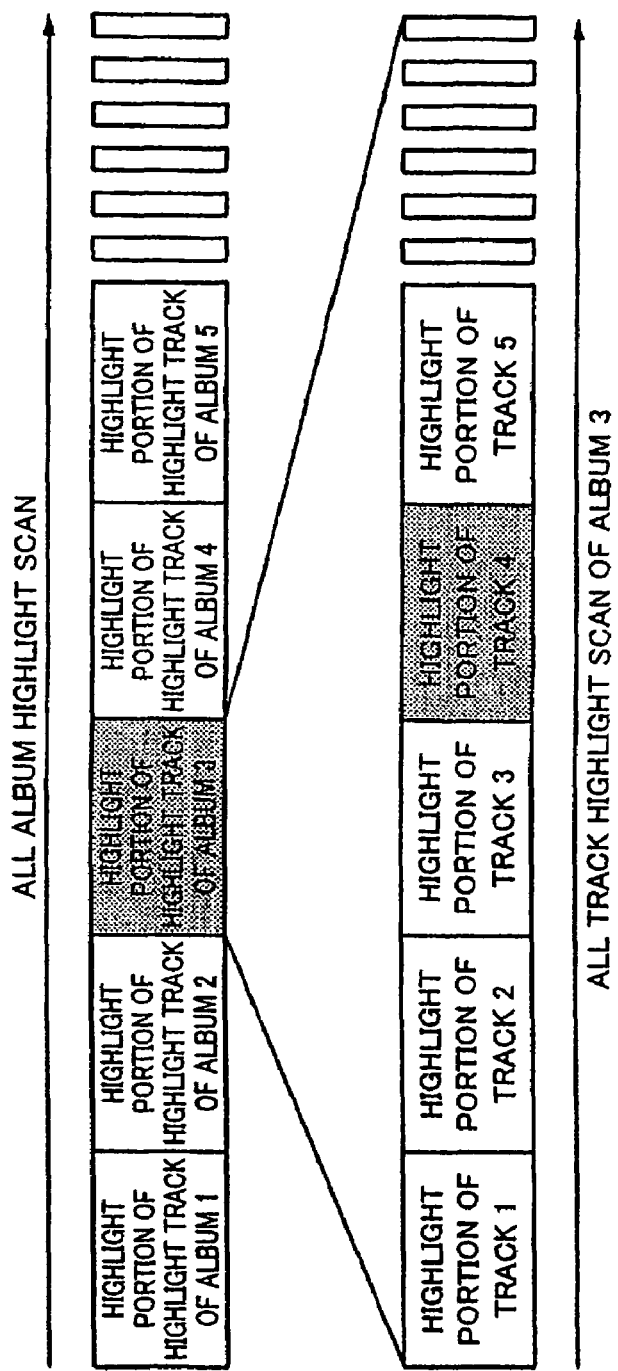
FIG. 27 is a schematic diagram showing an image of an album & track searching process of the dubbing apparatus according to the embodiment of the present invention.

To find user's desired track, the album highlight scan reproduction is performed. In reality, as shown in FIG. 27A, a highlight of a highlight track of album 1, a highlight of a highlight track of album 2, and so forth are successively reproduced.

When user's desired album has been found in the album highlight scan reproduction, the track highlight scan reproduction is performed. In reality, as shown in FIG. 27B, a highlight of track 1, a highlight of track 2, a highlight of track 3, and so forth are successively reproduced.

In the forgoing process, user's desired track can be found from a plurality of albums. When user's desired track has been found, audio data is reproduced from the track. In addition, with the play list registration key of the system controller 301, the user can register his or her desired track which has been found to a play list.

Figure 28:
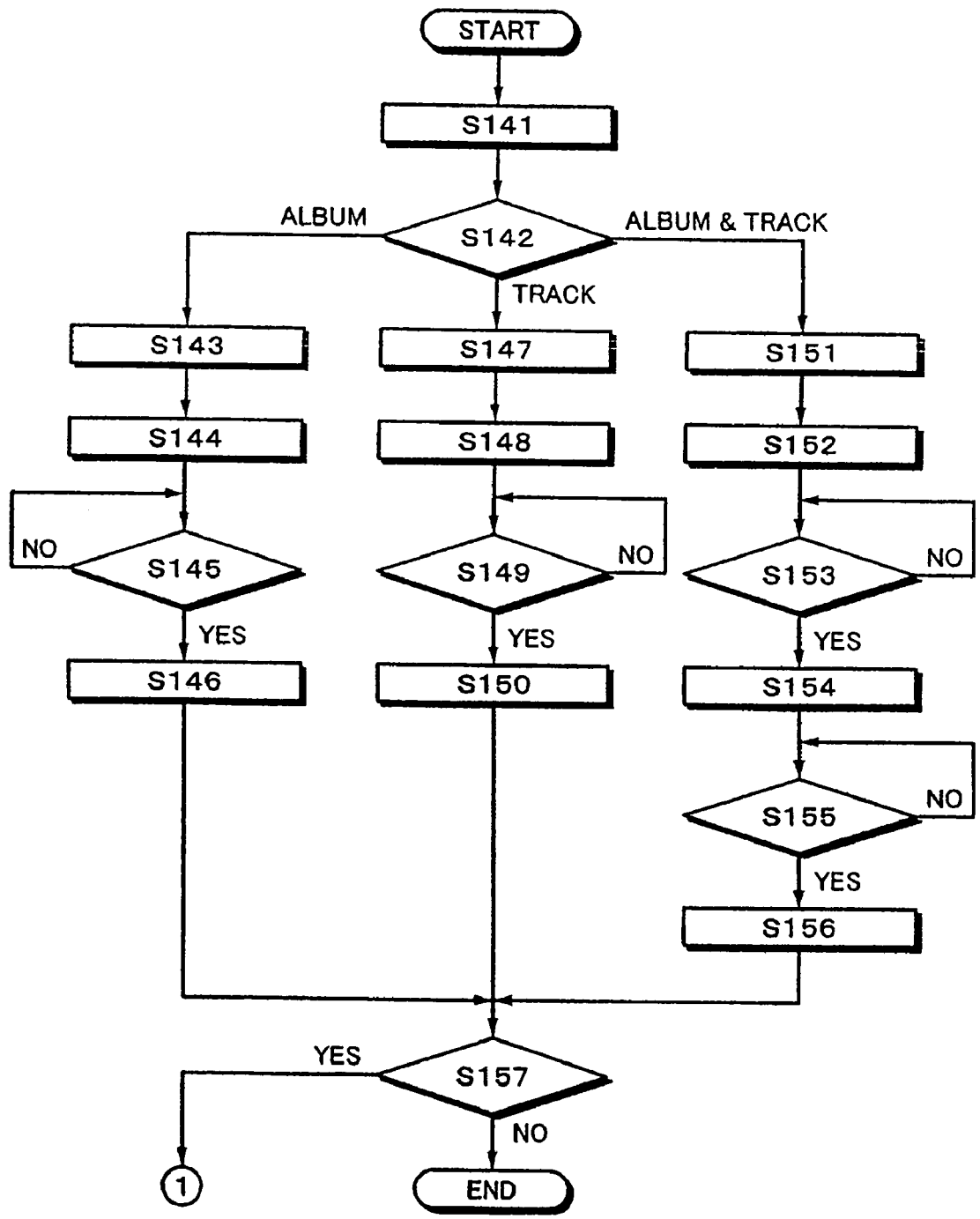
FIG. 28 is a flow chart for explaining a highlight searching operation and a highlight searching process of the dubbing apparatus according to the embodiment of the present invention.
Figure 29:
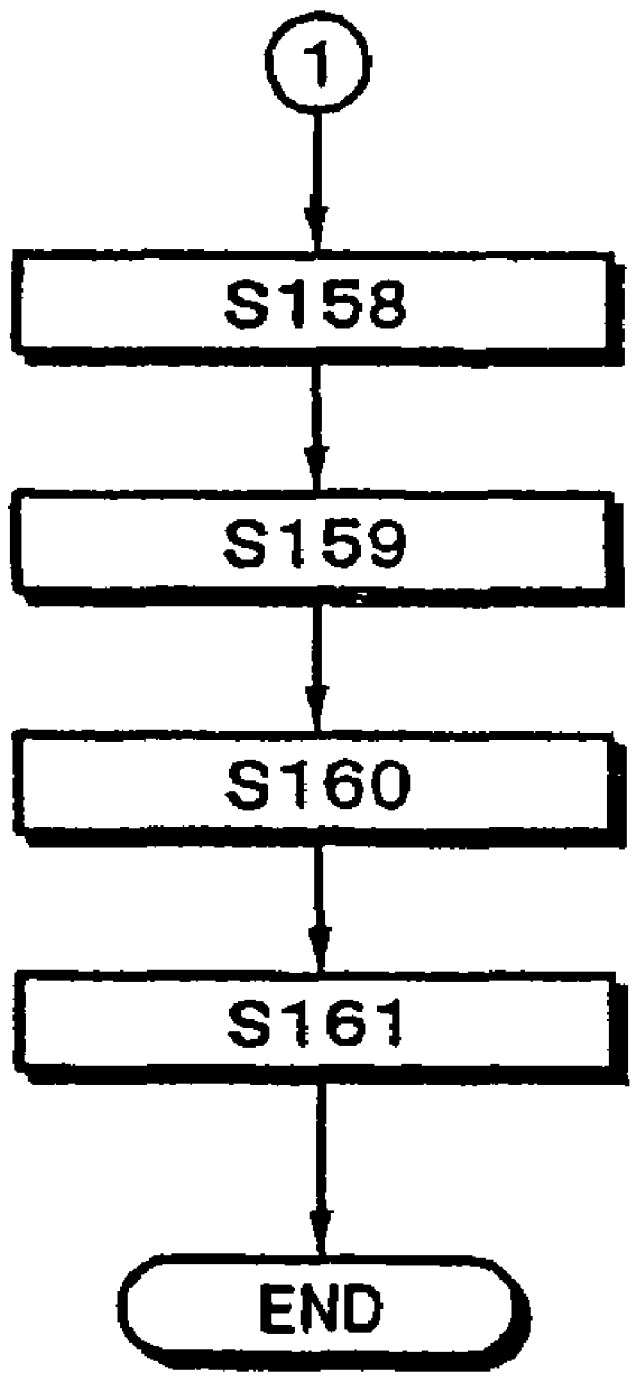
FIG. 29 is a flow chart for explaining a highlight searching operation and a highlight searching process of the dubbing apparatus according to the embodiment of the present invention.

FIGS. 28 and 29 are flow charts for explaining a highlight searching operation and a highlight searching process performed by the dubbing apparatus according to the embodiment of the present invention.

After the highlight searching process is started, the user presses the menu key and the display device 303 displays a search menu screen (at step S141).

Thereafter, the user selects his or her desired searching mode from the menu displayed on the search menu screen—namely, "album searching mode", "track searching mode", or "album & track searching mode" (at step S142).

When the user has selected the "album searching mode" as his or her desired searching mode, he or she presses the highlight key of the system controller 301 (at step S143) and the album highlight scan reproduction starts (at step S144). As a result, highlights of albums are reproduced in the order of folder numbers (the order of virtual slot numbers).

Thereafter, the user listens to the highlights of the albums reproduced by the control terminal 110 and checks whether or not audio data of his or her desired album is being reproduced (at step S145). When audio data of user's desired album is being reproduced, he or she presses the Yes key or the enter key of the system controller 301. As a result, audio data is reproduced from the first track of the album (at step S146). When audio data of use's desired album is not being reproduced, he or she listens to a highlight of the next album. When the user wants to stop the album highlight scan reproduction or the highlight of his or her desired album has been reproduced, with the No key or the cancel key, he or she can stop the album highlight scan reproduction.

When the user has selected the "track searching mode" as his or her desired searching mode at step S142, with a numeric key of the system controller 301, he or she selects his or her desired track of the current album. Thereafter, the user presses the highlight key of the system controller 301 (at step S147) and the track highlight scan reproduction starts (at step S148). As a result, highlights of tracks of the album (current album) selected at step S147 are reproduced in the order of track numbers.

Thereafter, the user listens to highlights of tracks of the album reproduced by the HD recording and reproducing device 101 and check whether or not his or her desired track is being reproduced (at step S149). When audio data of his or her desired track is being reproduced, the user presses the Yes key or the enter key of the system controller 301. As a result, audio data of the desired track is reproduced from the beginning (at step S150). When audio data of user's desired track is not being reproduced, he or she listens to a highlight of the next track. When the user wants to stop the track highlight scan reproduction at step S149 or a highlight of his or her desired track has been reproduced, with the No key or the cancel key, he or she can stop the track highlight scan reproduction.

When the user has selected the "album & track searching mode" as his or her desired searching mode at step S142, the user presses the highlight key of the system controller 301 (at step S151). As a result, highlights of albums are successively reproduced in the order of folder numbers (the order of virtual slot numbers).

Thereafter, the user listens to highlights of albums reproduced by the HD recording and reproducing device 101 and check whether or not a highlight of his or her desired album is being reproduced (at step S153). When a highlight of user's desired album is being reproduced, he or she presses the Yes key or the enter key of the system controller 301 and the track highlight scan reproduction starts. As a result, audio data of tracks of user's desired album is successively reproduced in the order of track numbers (at step S154). When audio data of user's desired album has not been reproduced, he or she listens to a highlight of the next album. When the user wants to stop the album highlight scan reproduction or the highlight of the desired album has been reproduced at step S153, with the No key or the cancel key, the user may stop the album highlight scan reproduction.

Thereafter, the user listens to highlights of tracks of the album selected at step S153 and checks whether or not audio data of the desired track is being reproduced (at step S155). When audio data of the desired track is being reproduced, with the Yes key or the enter key of the system controller 301, audio data of user's desired track is reproduced from the beginning (at step S156). When audio data of user's desired track is not being reproduced, the user listens to audio data of the next track. When the user wants to stop the track highlight scan reproduction or the highlight of his or her desired track has been reproduced at step S145, with the cancel key, he or she may stop the track highlight scan reproduction.

Thereafter, the user decides whether to register an album or a track searched in the album searching mode, the track searching mode, or the album & track searching mode to a play list (at step S157). When the user does not want to register the album or track to a play list, the operation and process are finished.

When the user wants to register the album or track to a play list, he or she presses the play list registration key of the operating device 304 of the system controller 301 (at step S158). As a result, the album or track is registered to a play list. At the point, a prompt "record destination play list ?" which asks the user to select a folder number of a folder (namely, a slot number of a virtual slot) to which a play list is registered is displayed on the display device 303 of the system controller 301 (at step S159).

Thereafter, with the operating device 304 of the system controller 301, the user selects a folder number of a folder (a slot number of a virtual slot) of the HD recording and reproducing device 101 (at step S160). As a result, a play list is created in the folder (virtual slot) selected at step S160. Alternatively, a play list created in the folder (virtual folder) selected at step S160 is updated. In addition, the database shown in FIG. 21 is restructured (at step S161). As a result, the play list has been registered.

Next, a track editing process performed by the dubbing apparatus according to the embodiment of the present invention will be described. As the track editing process, the dubbing apparatus according to the embodiment of the present invention can perform an erase editing process, a divide editing process, a move editing process, and a combine editing process. Next, with reference to FIGS. 30 to 34, these editing processes will be described. In FIGS. 30 to 34, each illustration surrounded by a solid line represents tracks of an album which has not been edited. In contrast, each illustration surrounded by a dotted line represents tracks of an album which has been edited.

In the dubbing apparatus according to the embodiment of the present invention, unless a highlight of a track has been set, first several seconds (for example, 10 seconds) of the track is set as a highlight thereof. As a result, when the track highlight scan reproduction is performed, the user can listen to highlights of all tracks. In addition, when a track has been divided, highlights of the divided portions are automatically set.

In addition, in the dubbing apparatus according to the embodiment of the present invention, when there is no highlight track (representative music program) of an album, track 1 is set as a highlight track. As a result, when the album highlight scan reproduction is performed, the user can listen to highlights of all albums. In addition, when a highlight track of an album has been erased, a highlight of the album can be always left.

With reference to FIG. 30, an erase editing process of the dubbing apparatus according to the embodiment of the present invention will be described. In this example, it is assumed that an album is composed of tracks 1, 2, 3, 4, and 5. FIG. 30A is a schematic diagram showing an image of tracks of an album for which the erase editing process has not been performed. In FIG. 30A, tracks 1, 2, 3, 4, and 5 are music programs A, B, C, D, and E, respectively. Highlights of these tracks have been set at positions represented with hatched portions shown in FIG. 30A. A highlight track of the album is track 3.

FIG. 30B is a schematic diagram showing an image of tracks after an erase editing process has been performed for a non-highlight track. In this example, FIG. 30B shows an image of which the erase editing process has been performed for track 2 (music program B) shown in FIG. 30A. As shown in FIG. 30B, when track 2 (music program B) shown in FIG. 30A has been erased, track numbers of tracks 3 to 5 of music programs are moved down. As a result, music programs C, D, and E become tracks 2, 3, and 4 shown in FIG. 30B. In addition, track 2 (music program C) becomes a highlight track of the album. In addition, as was described above, although track numbers of music programs C, D, and E are changed, music program C as a highlight track of the program is not changed.

FIG. 30C is a schematic diagram showing an image of tracks of which an erase editing process has been performed for a highlight track. In this example, track 3 (music program C) shown in FIG. 30A is a highlight track. As shown in FIG. 30C, when track 3 (music program C) as a highlight track has been erased, track numbers 4 and 5 are moved down. As a result, music programs D and E become tracks 3 and 4, respectively, as shown in FIG. 30B. In addition, since the highlight track of the album shown in FIG. 30A has been erased, track 1 (music program A) becomes a highlight track of the album.

With reference to FIG. 31, a divide editing process performed by the dubbing apparatus according to the embodiment of the present invention will be described. In this example, it is assumed that an album is composed of tracks 1, 2, 3, and 4.

FIG. 31A shows an image of the tracks of the album before the divide editing process has not been performed. In FIG. 31A, tracks 1, 2, 3, and 4 are music programs A, B, C, and D, respectively. Highlights of the tracks have been set at positions represented with hatched portions shown in FIG. 31A. In FIG. 31A, track 3 is a highlight track of the album.

FIG. 31B shows an image of the tracks of the album after the divide editing process has been performed for a non-highlight track. In this example, FIG. 31B shows an image of the tracks after the divide editing process has been performed for track 2 (music program B) shown in FIG. 31A. As shown in FIG. 31B, when track 2 (music program B) has been divided into two portions, the first half portion (music program $B_1$) of the two divided portions becomes track 2. The second half portion (music program $B_2$) of the two divided portions becomes track 3. Track numbers of music programs C and D are moved up. As a result, music programs C and D become tracks 4 and 5, respectively. In the dubbing apparatus according to the embodiment of the present invention, since a highlight of a track is kept after the track editing process has been performed, a highlight of track 2 (music program B) shown in FIG. 31A is kept as a highlight of the first half portion (music program $B_1$) of the divided track. On the other hand, a highlight of the second half portion (music program $B_2$) of the divided track is set at a beginning portion. In this case, music program C as a highlight of the album is not changed.

FIG. 31C shows an image of the tracks after the divide editing process has been performed for a highlight track. In this example, track 3 (music program C) shown in FIG. 31A is a highlight track. As shown in FIG. 31C, when track 3 (music program C) shown in FIG. 31A has been divided into two portions, the first half portion (music program $C_1$) of the divided track becomes track 3. The second half portion (music program $C_2$) of the divided track becomes track 4. The track number of music program D is moved up and becomes track 5. In the dubbing apparatus according to the embodiment of the present invention, since a highlight of a track is kept after the track editing process has been performed, a highlight of track 3 shown in FIG. 31A is kept as a highlight of the first half portion (music program $C_1$) of the divided track. On the other hand, a highlight of the second half portion (music portion $C_2$) of the divided track is set at a beginning portion. Music program $C_1$ becomes the highlight of the album.

In the forgoing example, the first half portion (music program $C_1$) of the divided music program C contains a highlight. However, when the second half portion (music $C_2$) of music C contains a highlight, a beginning portion of music $C_1$ is newly set as a highlight. The highlight of music program $C_2$ is the highlight of music program C for which the divide editing process has not been performed.

FIGS. 32 and 33 are schematic diagrams for explaining a move editing process of the dubbing apparatus according to the embodiment of the present invention. With reference to FIG. 32, a move editing process in the case that a track to be moved is not a highlight track will be described. With reference to FIG. 33, a move editing process in the case that a track to be moved is a highlight track will be described. It is assumed that an album from which a track is moved (hereinafter this album is referred to as source album) is composed of tracks 1, 2, 3, 4, and 5 and that an album to which a track is moved (hereinafter this album is referred to as destination album) is composed of tracks 1, 2, 3, and 4. First of all, a move editing process in the case that a track which is moved is not a highlight track of the source album will be described.

FIG. 32A shows an image of tracks of the source album for which the move editing process has not been performed. FIG. 32B shows an image of tracks of the destination album for which the move editing process has not been performed. Tracks 1, 2, 3, 4, and 5 of the source album are music programs A, B, C, D, and E, respectively. Tracks 1, 2, 3, and 4 of the destination album are music programs F, G, H, and I, respectively. In addition, highlights of the tracks of the source album and the destination album have been set at hatched positions shown in FIGS. 32A and 30B. A highlight track of the source album is track 3, whereas a highlight track of the destination album is track 1.

FIG. 32C shows an image of tracks of the source album in the case that the move editing process has been performed for a non-highlight track. FIG. 32D shows an image of tracks of the destination album in the case that the move editing process has been performed for a non-highlight track. In this example, the case that track 4 (music program D) of the source album is moved to the destination album and inserted as track 2 of the destination album will be described.

As shown in FIG. 32C, when track 4 (music program D) has been moved, since track 4 (music program E) is lost from the source album, the track number of music program E is moved down and becomes track 4. In this case, the highlight track of the source album is still track 3 (music program C).

As shown in FIG. 32D, when track 4 (music program D) shown in FIG. 32A has been inserted as track 2 of the destination album, the track numbers of music programs G, H, and I are moved up. As a result, music programs G, H, and I become tracks 3, 4, and 5, respectively. In this example, although the track is moved, since the track number of music program F as a representative music program of the destination album is not changed, the track number of the highlight of the destination album is not changed. If the track number of a music program as a representative music program of the destination album is changed when a track is moved from the source album to the destination album, the track number of the highlight will be changed. Next, the move editing process in the case that a track which is moved is a highlight track will be described.

FIG. 33A shows an image of tracks of a source album in the case that the move editing process has not been performed for a highlight track. FIG. 33B shows an image of tracks of a destination album in the case that the move editing process has not been performed for a highlight track. In this example, it is assumed that tracks 1, 2, 3, 4, and 5 of the source album from which a track is moved are music programs A, B, C, D, and E, respectively, and that tracks of a destination album to which a track is moved are music programs F, G, H, and I, respectively. Highlights of the tracks of the source album and the destination album have been set at hatched positions shown in FIGS. 32A and 32B. A highlight track of the source album is track 3, whereas a highlight track of the destination album is track 1.

FIG. 33C shows an image of the tracks of the source album in the case that the move editing process has been performed for a highlight track. FIG. 33D shows an image of the tracks of the destination album in the case that the move editing process has been performed for a highlight track. In this example, the case that track 3 (music program C) of the source album is moved to the destination album and inserted as track 2 of the destination album will be described.

As shown in FIG. 33C, since track 3 (music program C) of the source album has been moved, the track number of music program E is moved down and becomes track 4. In addition, since track 3 (music program c) as the highlight track has been lost, track 1 becomes a highlight track of the source album.

As shown in FIG. 33D, since track 3 (music program C) of the source album has been moved, the track numbers of music programs G, H, and I are moved up. As a result, music programs G, H, and I shown in FIG. 32B become tracks 3, 4, and 5 shown in FIG. 32D, respectively. In this case, the highlight track of the destination album is still track 1 (music program F).

With reference to FIG. 34, a combine editing process of the dubbing apparatus according to the embodiment of the present invention will be described. In this example, it is assumed that an album is composed of tracks 1, 2, 3, 4, and 5.

Figure 34A:
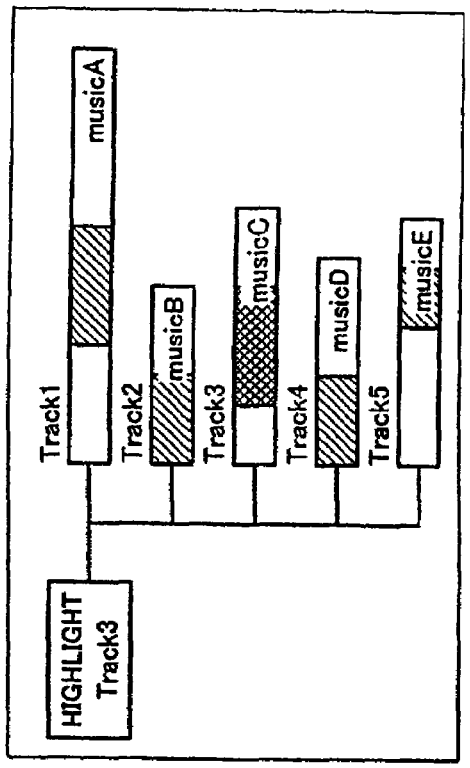
FIG. 34 is a schematic diagram showing an image for explaining a combine editing operation of the dubbing apparatus according to the embodiment of the present invention.

FIG. 34A shows an image of the tracks of the album in the case that the combine editing process has been performed. It is assumed that tracks 1, 2, 3, 4, and 5 are music programs A, B, C, D, and E, respectively. Highlights of the tracks have been set at hatched positions shown in FIG. 34A. A highlight track of the album is track 3.

Figure 34C:
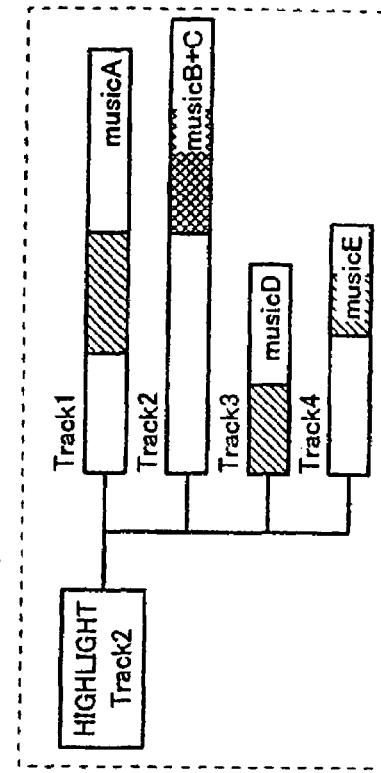
Figure 34B:
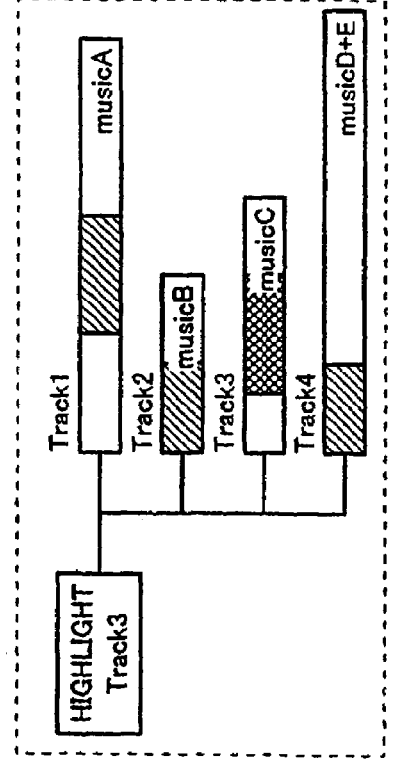

FIG. 34B shows an image of the tracks in the case that the combine editing process has been performed for non-highlight tracks. FIG. 34B shows the case that the combine editing process has been performed for track 4 (music program D) and track 5 (music program E) shown in FIG. 34A. As shown in FIG. 34B, when the combine editing process has been performed, music programs D and E becomes track 4. According to the embodiment of the present invention, when two tracks are combined, a highlight of a track having the lower track number becomes a highlight of the combined track. Thus, the highlight of track 4 (music program D) shown in FIG. 34A becomes the highlight of track 4 (music programs D and E) shown in FIG. 34B.

FIG. 34C shows an image of the tracks in the case that the combine editing process has been performed for a highlight track and a non-highlight track. FIG. 34C shows the case that the combining process has been performed for track 2 (music program B) and track 3 (music program C) shown in FIG. 34A. As shown in FIG. 34B, music programs B and C become track 2. In addition, track 2 becomes a highlight track. When non-highlight tracks are combined, a highlight of a track having the smaller track number of the two tracks becomes a highlight of the combined track. In contrast, when a highlight track and a non-highlight track are combined, a highlight of a highlight track becomes a highlight of the combined track. Thus, the highlight of track 3 (music program C) shown in FIG. 34A becomes a highlight of track 2 (music programs B and C) shown in FIG. 34C.

As was described above, in the dubbing apparatus according to the embodiment of the present invention, a highlight of an album and a highlight of a track can be kept in the state before a track editing process has been performed.

As was described above, according to the embodiment of the present invention, in the HDD 104 of the HD recording and reproducing device 101, folders corresponding to slots of the CD changer 1 are created. Audio data of albums loaded in the CD changer 1 is automatically stored in the folders. Thus, even if the user does not know the internal structure of the HDD 104, he or she can easily store audio data of albums from the CD changer 1 to the HDD 104.

In addition, audio data of albums loaded in the CD changer 1 can be stored to the HDD 104 in such a manner that an image of the albums is maintained. Thus, the user can intuitively know albums stored in the HDD 104. As a result, the user can easily reproduce his or her desired music program from the HDD 104.

In addition, play lists are also managed in the same manner as albums. In other words, each play list is managed as one album. Thus, albums and play lists can be managed totally, not separately.

In addition, the dubbing apparatus according to the embodiment of the present invention has three searching modes: the album searching mode for successively reproducing highlights of albums and searching them for a desired album, the track searching mode for successively reproducing highlights of tracks of a designated album and searching them for a desired track, and the album & track searching mode for successively reproducing highlights of albums, searching them for a desired album, successively reproducing highlights of tracks of a designated album, and searching them for a desired track. Thus, the user can easily search a plurality of albums for his or her desired album. In addition, the user can easily search a designated album stored in the HD recording and reproducing device 101 for his or her desired track. Moreover, the user can easily search a plurality of albums stored in the HD recording and reproducing device 101 for his or her desired track.

In addition, the dubbing apparatus according to the embodiment of the present invention has the first registration mode for allowing the user to register a highlight with one key operation, the second registration mode for allowing the user to rehearsal reproduce registered highlights and register his or her desired highlight, and the third registration mode for allowing the user to rehearsal reproduce a start point and an end point of his or her desired highlight, check them, finely adjust them, and register the desired highlight. Thus, not only the user can easily register a highlight, but he or she can check whether or not his or her desired highlight has been registered and register the desired highlight. In addition, the user can finely adjust an area for a highlight and a start point and an end point thereof.

In addition, when a highlight of a track is registered, a highlight of an album is automatically updated. Thus, the user does not need to newly register a highlight of an album.

In addition, in the dubbing apparatus according to the embodiment of the present invention, when the album highlight scan reproduction, the track highlight scan reproduction, or both of them are performed, the user can intuitively and easily search a plurality of albums stored in the HD recording and reproducing device 101 for his or her desired album, a designated album stored therein for his or her desired track, or a plurality of album stored therein for his or her desired track.

In addition, when the track highlight scan reproduction is performed, since highlights of tracks of a designated album are successively reproduced, the user can easily and quickly search the designated album for his or her desired track.

In addition, when the album highlight scan reproduction is performed, since highlights of highlight tracks which are representative music programs of albums are successively reproduced, the user can easily and quickly search the albums for his or her desired album.

In addition, in the album & track searching mode, since highlights of highlight tracks which are representative music programs of albums are successively reproduced, user's desired album is designated, highlights of tracks of the designated album are successively reproduced, and the tracks are searched for his or her desired track, he or she can quickly search a plurality of albums for his or her desired track.

In addition, when the erase editing process, the divide editing process, the move editing process, or the combine editing process has been performed, since a highlight of each track and a highlight of each album are neither lost, nor moved to different positions. Thus, after each editing process has been performed, the user does not need to newly register highlights.

In addition, while listening to highlights of albums and tracks, the user can search them for his or her desired album and track. Thus, the user can easily search them for his or her desired album and track. In addition, the user can intuitively search them for his or her desired album and track. In addition, even if the user does not know an album name and a track name which he or she wants to search for, he or she can easily search for them.

When an editing process is performed for a track of an album, a track number of a highlight track of the album can be automatically updated. Thus, the user's operation performed for the editing process can be alleviated.

In addition, by selecting an album from a menu, selecting a track from the selected album, reproducing the selected track, and registering the selected track, the user can register a highlight without need to access deeper layers. Thus, the user can easily register a highlight.

Although the embodiment of the present invention has been practically described, the present invention is not limited thereto. It should be understood by those skilled in the art that the foregoing and various other changes, omissions, and additions in the form and detail thereof may be made therein without departing from the spirit and scope of the present invention.

For example, according to the forgoing embodiment, music data is stored in the HDD 104. Alternatively, video data may be stored in the HDD 104. Alternatively, audio data may be stored in the HDD 104.

In addition, according to the forgoing embodiment, the present invention is applied for the dubbing apparatus having the CD changer 1 and the HD recording and reproducing device 101. However, it should be noted that the structure of the dubbing apparatus is not limited to such an example. In other words, the present invention may be applied to a dubbing apparatus having a DVD (Digital Versatile Disc) changer player and a HD recording and reproducing device, a dubbing apparatus having an MD (Mini Disc) changer player and a HD recording and reproducing device, and so forth.

In addition, according to the forgoing embodiment, music data is stored in the HD recording and reproducing device 101. Alternatively, video data, audio data, and so forth may be stored in the HD recording and reproducing device 101.

In addition, according to the forgoing embodiment, the dubbing apparatus has a reproducing device which reproduces data from an optical disc. Alternatively, the dubbing apparatus may be a reproducing device which reproduces data from another type of a recording medium. For example, the reproducing device may reproduce data from a magnetic tape such as a music tape, a video tape, a DAT (Digital Audio Tape), or the like. Alternatively, the reproducing device may reproduce data from a magnetic disc such as a ZIP. In addition, the reproducing device may reproduce data from a non-volatile memory.

In addition, according to the forgoing embodiment, a pair of a folder name and an artist name and a pair of a track name and an artist name are registered with the operating device 304 of the system controller 301. However, the present invention is not limited to such a registering method. In other words, when a recording medium stores character information such as CD-TEXT, a folder/track name and an artist name may be automatically registered corresponding to the character information.

In the forgoing embodiment, files recorded on the HDD 104 of the HD recoding and reproducing device are managed corresponding to FAT. Alternatively, files may be managed corresponding to NTFS (NT File System), HFS (Hierarchical File System), HFS Plus, or the like.

In addition, according to the forgoing embodiment, the CD changer 1, the HD recording and reproducing device 101, and the audio input and output device 201 are controlled by the system controller 301. Alternatively, these devices may be controlled by a personal computer. In reality, software for controlling the CD changer 1, the HD recording and reproducing device 101, and the audio input and output device 201 is installed to the personal computer. These devices are connected to the personal computer through USB cables or the like. In such a structure, the dubbing apparatus is controlled through the personal computer.

According to the forgoing embodiment, data is transmitted and received between these devices through cables. Alternatively, data may be wirelessly transmitted and received between these devices.

In addition, according to the forgoing embodiment, besides music data, ISRC is also stored from the CD changer 1 to the HD recording and reproducing device 101. With ISRC, albums may be prevented from being redundantly recoded. For example, by comparing an ISRC code of an album reproduced by the CD changer 1 with an ISRC code stored in the HD recording and reproducing device 101, it can be determined whether or not an album to be recorded has been stored in the HD recording and reproducing device 101.

In addition, in the forgoing embodiment, as an interface for connecting the system controller 301 and the CD changer 1, IEEE 1394 (iLink) may be used. Likewise, as an interface for connected the system controller 301 and the HD recording and reproducing device 101 or an interface for connecting the system controller 301 and the audio input and output device 201, IEEE 1394 (iLink) may be used. As a result, even if the manufacturer of the system controller 301 is different from the manufacturer of each device, commands can be exchanged between the system controller 301 and each device.

In the dubbing apparatus according to the forgoing embodiment of the present invention, a pair of the HD recording and reproducing device 101 and the audio input and output device 201, a pair of the HD recording and reproducing device 101 and the system controller 301, or a set of the HD recording and reproducing device 101, the audio input and output device 201, and the system controller 301 may be integrally structured. Alternatively, a pair of the CD reproducing device 1 and the audio input and output device 201, a pair of the CD reproducing device 1 and the system controller 301, or a set of the CD reproducing device 1, the audio input and output device 201, and the system controller 301 may be integrally structured.

In addition, according to the forgoing embodiment, when a highlight of a track of an album is newly registered, the track is automatically registered as a highlight track of the album. Alternatively, the user may freely set a highlight track with the operating device 304 of the system controller 301.

In addition, according to the forgoing embodiment, files are created corresponding to albums. Alternatively, files may be created corresponding to tracks. When files are created corresponding to tracks, files created with the same album are stored in one folder (virtual slot) and managed therewith.

As was described above, according to the present invention, while a group is being searched for a representative program, a designated program is being searched for a representative portion, a designated group is being searched for a representative portion, a desired group and a desired program can be found. Thus, the user can easily find his or her desired group or program from a plurality of groups.

In addition, when an editing process is performed for a program of a group, a representative program number of the group can be automatically updated. Thus, the operation performed for the editing process by the user can be alleviated.

The invention claimed is:

1. A reproducing apparatus comprising:
   storage configured to store a plurality of groups of programs and management information including group information for each group of the plurality of groups of programs;
   a reproduction unit configured to reproduce a program; and
   a controller configured to set at least a portion of one program in each group of the plurality of groups of programs as a representative of the group and thereby set a plurality of representatives respectively corresponding to the plurality of groups of programs and to control said reproduction unit to reproduce the plurality of representatives successively.

2. The reproducing apparatus of claim 1, wherein said controller is configured to set at least a portion of one program in at least one respective group as a representative of the at least one respective group when the representative of the at least one respective group is not set.

3. The reproducing apparatus of claim 2, wherein said controller sets at least a portion of a sequentially first program in the at least one respective group as the representative of the at least one respective group.

4. The reproducing apparatus of claim 1, further comprising an input unit configured to input a user's command, and wherein said controller controls said storage to store information of one program as a representative of a group based on an input by said input unit.

5. The reproducing apparatus of claim 4, further comprising an input unit configured to input a user's command, and wherein said controller controls said storage to update the information of the representative of the group based on an input by said input unit.

6. The reproducing apparatus of claim 1, further comprising an input unit configured to input a user's command, and wherein when said input unit inputs a command of reproduction-start, a program in the group is started to be reproduced.

7. The reproducing apparatus of claim 1, wherein the at least a portion of the one program is highlight of the one program.

8. The reproducing apparatus of claim 7, wherein said controller edits a starting point of the highlight in highlight information based on an input from said input unit.

9. The reproducing apparatus of claim 8, wherein said highlight information comprises position information of the highlight.

10. The reproducing apparatus of claim 8, wherein said controller edits an ending point of the highlight in the highlight information based on said input from said input unit.

11. The reproducing apparatus of claim 10, wherein said controller edits the ending point of said highlight, the ending point of the highlight being a point that is a predetermined time later from the staffing point.

12. In a reproducing apparatus comprising an input unit configured to input a user's command and a reproduction unit configured to reproduce a program, a method comprising acts of:
    storing, in storage, a plurality of groups of programs and management information including group information for each group of the plurality of groups of programs;
    setting at least a portion of one program in the group of the plurality of groups of programs as a representative of the group and thereby set a plurality of representatives respectively corresponding to the plurality of groups of programs; and
    controlling the reproduction unit to reproduce the plurality of representatives successively.

13. The method of claim 12, wherein the act of controlling comprises setting at least a portion of one program in the at least one respective group as a representative of the at least one respective group when the representative of the at least one respective group is not set.

14. The method of claim 12, wherein the act of controlling comprises setting at least a portion of a sequentially first program in the group as the representative of the at least one respective group.

15. The method of claim 12, wherein the act of controlling comprises controlling said storage to store information of one program as a representative of a group based on an input by said input unit.

16. The method of claim 15, wherein the act of controlling comprises controlling said storage to update the information of the representative of the group based on an input by said input unit.

17. The method of claim 12, wherein the at least a portion of the one program is highlight of the one program.

18. The method of claim 17, wherein the act of controlling comprises editing a starting point of the highlight in highlight information based on an input from said input unit.

19. The method of claim 18, wherein said highlight information comprises position information of the highlight.

20. The method of claim 18, wherein the act of controlling comprises editing an ending point of a highlight in the highlight information based on said input from said input unit.

21. The method of claim 20, wherein the act of controlling comprises editing the ending point of said highlight, the ending point of the highlight being a point that is a predetermined time later from the starting point.

22. The reproducing apparatus of claim 1, wherein the groups comprise albums and the programs of the groups comprise tracks of the albums.

23. The method of claim 12, wherein the groups comprise albums and the programs of the groups comprise tracks of the albums.

* * * * *